(12) United States Patent
Barber

(10) Patent No.: US 11,885,297 B2
(45) Date of Patent: Jan. 30, 2024

(54) TRANSITIONING WIND TURBINE

(71) Applicant: Gerald L. Barber, Greenville, SC (US)

(72) Inventor: Gerald L. Barber, Greenville, SC (US)

( * ) Notice: Subject to any disclaimer, the term of this patent is extended or adjusted under 35 U.S.C. 154(b) by 56 days.

(21) Appl. No.: 17/715,357

(22) Filed: Apr. 7, 2022

(65) Prior Publication Data
US 2022/0228566 A1 Jul. 21, 2022

Related U.S. Application Data

(63) Continuation-in-part of application No. 16/987,045, filed on Aug. 6, 2020, now Pat. No. 11,306,702, (Continued)

(51) Int. Cl.
| | |
|---|---|
| *F03D 13/20* | (2016.01) |
| *F03D 1/06* | (2006.01) |
| *F03D 80/80* | (2016.01) |
| *F03D 9/32* | (2016.01) |
| *F03D 13/25* | (2016.01) |

(52) U.S. Cl.
CPC .......... *F03D 13/20* (2016.05); *F03D 1/0625* (2013.01); *F03D 9/32* (2016.05); *F03D 13/25* (2016.05); *F03D 80/80* (2016.05); F05B 2220/706 (2013.01); F05B 2230/6102 (2013.01); F05B 2240/12 (2013.01); F05B 2240/912 (2013.01); F05B 2240/9152 (2013.01); F05B 2240/93 (2013.01); F05B 2240/95 (2013.01); F05B 2260/02 (2013.01)

(58) Field of Classification Search
None
See application file for complete search history.

(56) References Cited

U.S. PATENT DOCUMENTS

| 1,233,232 A | 7/1917 | Hayroth |
|---|---|---|
| 4,105,363 A | 8/1978 | Loth |

(Continued)

FOREIGN PATENT DOCUMENTS

| CN | 107021190 | 8/2017 |
|---|---|---|
| DE | 102007028839 | 12/2008 |

(Continued)

OTHER PUBLICATIONS

Girerd M—WO-2012032244-A1 + machine translation (Year: 2012).*

(Continued)

*Primary Examiner* — Juan G Flores
(74) *Attorney, Agent, or Firm* — Kim and Lahey Law Firm, LLC; Seann P. Lahey

(57) ABSTRACT

An anchoring and lifting system for a wind turbine tower having a tower base; a plurality of base anchors attached to the tower base; an anchor outrigger attached to and extending laterally outward from the tower base; at least one secondary anchor attached to the anchor outrigger; a lifting outrigger attached to a hinge wherein the hinge connects the tower base and a tower for moving the tower between a raised position and a lowered position; a static cable connected between a distal end of the lifting outrigger and a hub attached to the tower; and, a lifting cable attached between the distal end of the lifting outrigger and a winch, wherein the winch is carried by the tower base.

20 Claims, 22 Drawing Sheets

Related U.S. Application Data which is a continuation of application No. 16/059,126, filed on Aug. 9, 2018, now Pat. No. 10,788,016, which is a continuation-in-part of application No. 15/975,004, filed on May 9, 2018, now Pat. No. 10,941,751.

(60) Provisional application No. 63/236,058, filed on Aug. 23, 2021, provisional application No. 62/543,206, filed on Aug. 9, 2017, provisional application No. 62/504,041, filed on May 10, 2017.

(56) References Cited

U.S. PATENT DOCUMENTS

| | | | |
|---|---|---|---|
| 4,201,514 A | 5/1980 | Huetter | |
| 4,221,088 A * | 9/1980 | Patterson | E04H 12/34 52/120 |
| 4,251,040 A | 2/1981 | Loyd | |
| 4,297,076 A | 10/1981 | Donham | |
| 4,364,708 A | 12/1982 | David | |
| 5,096,382 A | 3/1992 | Gratzer | |
| 5,320,491 A | 6/1994 | Coleman | |
| 5,390,618 A | 2/1995 | Wolff | |
| 6,064,123 A | 5/2000 | Gislason | |
| 6,200,180 B1 | 3/2001 | Hooper | |
| 6,253,701 B1 | 7/2001 | Dale | |
| 6,408,575 B1 * | 6/2002 | Yoshida | F03D 13/20 52/745.17 |
| 6,522,025 B2 | 2/2003 | Willis | |
| 6,955,025 B2 | 10/2005 | Dehlsen et al. | |
| 7,112,010 B1 | 9/2006 | Geiger | |
| 7,582,977 B1 | 9/2009 | Dehisen | |
| 7,825,532 B1 | 11/2010 | Barber | |
| 8,011,098 B2 | 9/2011 | Vorhies | |
| 8,109,727 B2 | 2/2012 | Barber | |
| 8,134,251 B2 | 3/2012 | Barber | |
| 8,164,212 B2 | 4/2012 | Barber | |
| 8,174,142 B2 | 5/2012 | Barber | |
| 8,178,993 B1 | 5/2012 | Barber | |
| 8,258,645 B2 | 9/2012 | Barber | |
| 8,373,298 B2 | 2/2013 | Barber | |
| 8,466,577 B2 | 6/2013 | Barber | |
| 8,487,471 B2 | 7/2013 | Barber | |
| 8,622,011 B2 | 1/2014 | Jahnig et al. | |
| 8,910,432 B2 * | 12/2014 | Egan | F24S 25/10 52/117 |
| 9,522,716 B2 | 12/2016 | Rodriguez | |
| 9,708,036 B2 | 7/2017 | Ries | |
| 9,738,351 B2 | 8/2017 | Bergua | |
| 2004/0169376 A1 | 9/2004 | Ruer | |
| 2005/0260040 A1 | 11/2005 | Ingle | |
| 2006/0120809 A1 | 6/2006 | Ingram | |
| 2007/0036657 A1 | 2/2007 | Wobben | |
| 2009/0127860 A1 | 5/2009 | Brown | |
| 2009/0159549 A1 | 6/2009 | Trede | |
| 2010/0293781 A1 | 11/2010 | Foo | |
| 2011/0041752 A1 | 2/2011 | LaCivita | |
| 2011/0061582 A1 | 3/2011 | Braud | |
| 2011/0068729 A1 | 3/2011 | Barber | |
| 2011/0119889 A1 | 5/2011 | Numajiri | |
| 2011/0138706 A1 | 6/2011 | Voss et al. | |
| 2011/0154636 A1 | 6/2011 | Smith | |
| 2012/0045345 A1 | 2/2012 | Horton | |
| 2014/0079489 A1 | 3/2014 | Naquin | |
| 2014/0248090 A1 | 9/2014 | Fernandez Gomez | |
| 2014/0265344 A1 | 9/2014 | Barber | |
| 2014/0271183 A1 | 9/2014 | Barber | |
| 2015/0063910 A1 | 3/2015 | Meltsov et al. | |
| 2015/0292470 A1 | 10/2015 | Sun | |
| 2016/0194058 A1 | 7/2016 | Ries | |
| 2016/0319798 A1 | 11/2016 | Blodgett | |
| 2017/0349243 A1 | 12/2017 | Lisland | |

FOREIGN PATENT DOCUMENTS

| | | |
|---|---|---|
| EP | 123820953 | 3/2012 |
| JP | 2004251139 A | 9/2004 |

OTHER PUBLICATIONS

Bourdel J A J—FR-2916785-A1 + machine translation (Year: 2008).*

Dietrich, Fabian, "Evaluation of Theoretical Capacity Models for Plate Anchors in Sand in Relation to Floating Offshore Wind Turbines", (2014); Open Access Master's Theses Paper 365, digitalcommons@etal.uri.edu. (Year 2014).

* cited by examiner

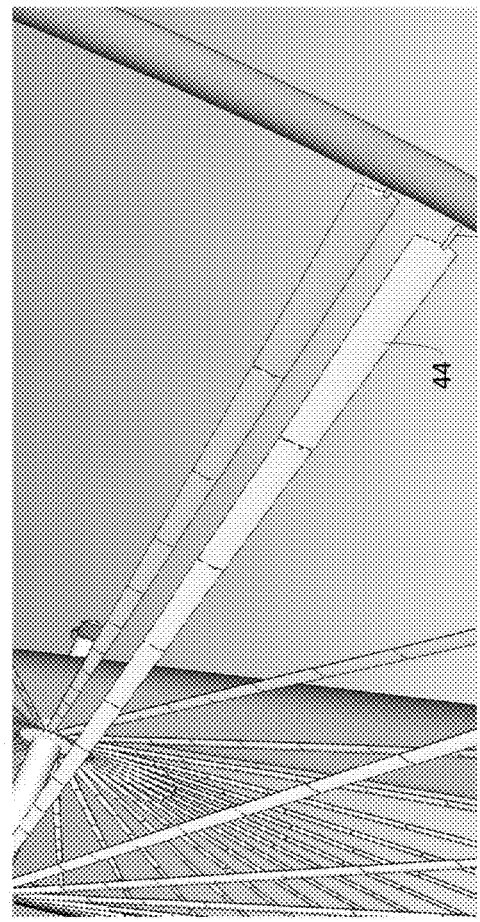
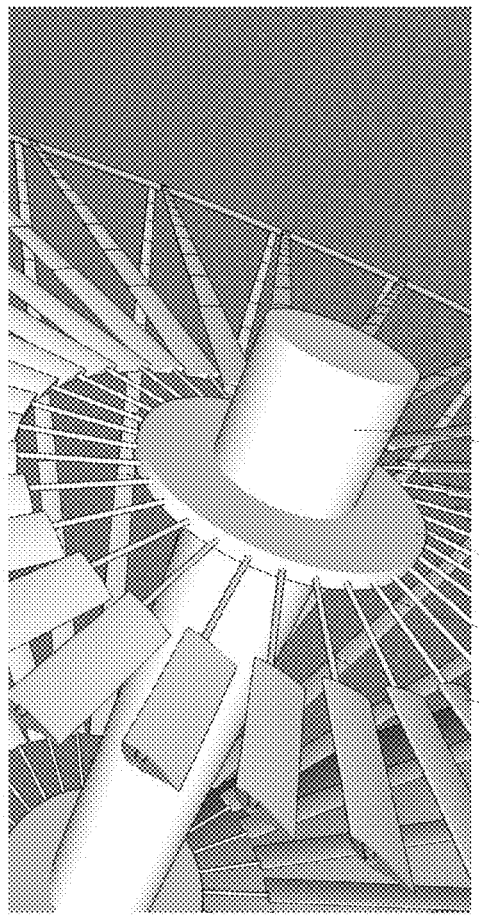

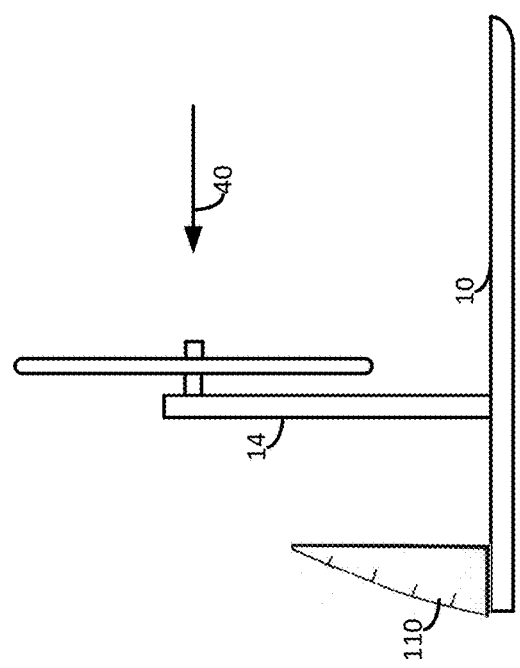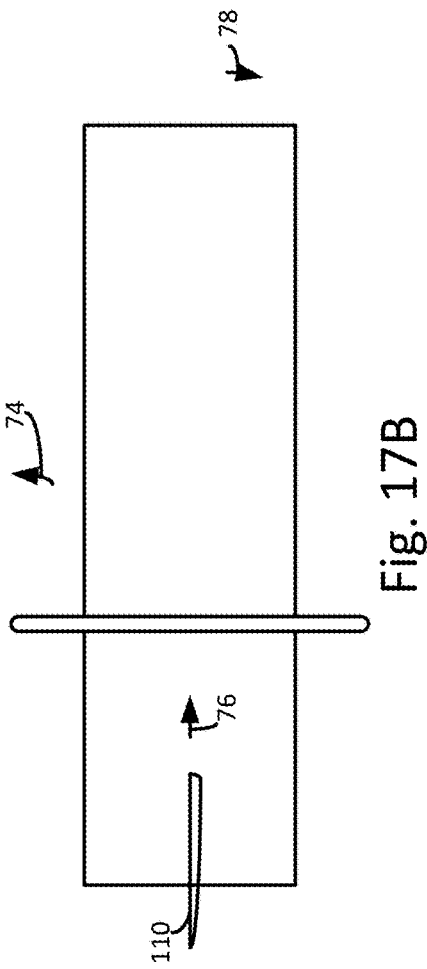

TRANSITIONING WIND TURBINE

BACKGROUND OF THE INVENTION

1) Field of the Invention

A wind turbine, both land-based and offshore, that can be easily erected from a generally horizontal position for maintenance, safety and transport to a generally vertical position in operation. Further, the present system relates generally to the support and anchoring of an object to a non-hardened base and a lifting system for a tower such as used with wind turbine systems. The anchoring system can be used on land or can secure a wind turbine to the floor of a body of water.

2) Description of Related Art

The development of wind-energy in the U.S. has ramped up in recent years, especially with a renewed focus on renewable energy. There has also been increased interest in offshore wind turbines as winds generated over large bodies of water, particularly over an ocean, are not confronted with mountains, buildings, and the vegetation of the land masses that tend to slow the velocity of winds. The turbulence of wind is usually less over water than over land. This may be because there is a greater temperature variance between different altitudes over land than over a body of water, apparently, because sunlight is absorbed further into water than into land, and for comparable conditions, the surfaces of land become warmer and radiates more heat than the surfaces of water. Also, some of the largest cities of the world are positioned adjacent to large bodies of water such as adjacent oceans and seas where wind velocities are not slowed and are less turbulent near the water surface and are more predictable.

Another advantage of the wind turbine placed on bodies of water is that the less turbulent winds at the surface of the water allow the turbine wheel to be supported lower and closer to the surface of the water. This tends to reduce the expense of having a tall tower as usually required for land mounted wind turbines. Accordingly, it would be desirable to locate wind turbines on bodies of water spaced relatively close to a land mass where there is a need for electricity. Also, it would be desirable to produce wind turbines with a means for reducing the longitudinal force applied by the turbine wheel to the tower or other vertical support of the wind turbine.

According to one study, however, offshore wind turbines built according to traditional standards used for land-based systems and using designs may not be able to withstand the gusts of a category 5 hurricane and thereby pose a risk of personal and property damage. Further, the potential damage to the wind turbine from one storm can dramatically reduce the financial viability of an offshore project. Further, current designs do not handle veer which is the measure of the change of wind across a vertical span. The strain on the blades can be too great creating damage to the blades and hub.

One study predicts that offshore turbines will face hurricane wind gusts in excess of 223 miles per hour but can only withstand gusts of 156 miles per hour. The problem seems to stem from the fact that offshore turbine designs find its origin in Europe, where hurricane conditions are essentially nonexistent. While the land-based system may not face these wind forces, it would be advantage to have a wind turbine system that could be lowered in the event of these damaging winds or storms.

Accordingly, it would be beneficial to have a wind turbine that could be placed in a generally horizontal position with fairly little effort when a damaging wind or storms are anticipated.

An additional issue with wind turbine using conventional designs is that maintenance of the wind turbine is challenging. Over the lifetime of a wind turbine, it is inevitable that large components, including rotor blades, generators, transformers, and gearboxes, will need to be repaired or replaced through wear or damage. With some designs, these components are over one hundred (100) feet in the air. The problems are magnified when the wind turbine is offshore, and the components are one hundred feet over the ocean and must be accessed through floating barges, cranes, or other watercraft. In some cases of offshore installations, the components are removed from the offshore locations, transported to land, repaired, transported back to the offshore location and installed, utilizing a crane to reach the highest components.

It would be advantageous to have a wind turbine design that is capable of being lowered for transportation and repair. It would also be advantageous to have a wind turbine where the components can be repaired without having to transport the turbine or components to land.

In typical form, a wind turbine requires a tower or a mast to which the hub of rotors, blades, cables, wheels, or foils can be mounted. Typically, the tower is made of a metal such as steel and is secured to a foundation that is typically reinforced concrete. The tower includes a base that is secured to the concrete by using anchor bolts. The anchor bolts can extend anchor holes through a flange that can be at the bottom of the tower. These anchor bolts are inserted into the anchor holes and are secured with nuts. The bolts and nuts are one type of fastener that can be used. Typically, the anchor bolts are connected to an anchor ring embedded in the concrete foundation. The concrete surface of the foundation can include a friction surface so that the joint between the concrete foundation, anchor ring, and flange is created to assist with securing the tower in place. On example of prior attempts to make a wind turbine anchor is shown in United States Patent Application Publication 20110138706.

However, these designs require a concrete foundation, plates, and other structure that do not provide sufficient anchoring or stability when the underlying surface of a soft material such as with sand or the floor of a body of water. Further, when the underlying surface of a soft material, erecting the tower, such as for a wind turbine, can be difficult as the equipment (e.g., tall crane) cannot easily access the area One effect of having a rotating wind turbine is that there is a gyroscopic effect resulting from the rotation energy. This can, among other factors, create horizontal deflection so that the wind turbine will rotate away from an optimal angle of attack. There have been attempts to reduce or eliminate these forces keeping a wind turbine facing into the wind without hub and gearbox stresses. The concepts include controlling the pitch of individual blades, to decreasing gyroscopic forces on the rotor when yawing. This concept presumes to take advantage of the wind's kinetic energy on the blade to assist in turning the turbine into the wind. Such a control feature cyclically alters blade pitch as the wind direction changes so as to present different angles of attack between the blades and wind. This concept may also eliminate the need for yaw drive motors. Experiments with this concept have been conducted on a small scale but continued research and investments are needed before this technology reaches large-scale wind turbines.

These disadvantages are especially troublesome with offshore wind turbines. Therefore, it would be advantageous to have an offshore wind turbine that can counter the gyroscopic effects of the wind turbine without resorting to thrusters, or other powered means which necessarily draw power from the system reducing its overall output. With these powered attempts, power from the wind turbine is diverted to thrusters and cannot be delivered to the power grid or other locations.

Therefore, it would be advantageous to have an offshore wind turbine that can be easily erected and lowered and does not rely upon powered means to maintain a proper angle of attack between the wind turbine and the wind direction.

It is a further object of the present invention to provide an anchoring system that can support the wind turbine in soft ground materials.

BRIEF SUMMARY OF THE INVENTION

The above can be accomplished by providing a transitioning wind turbine comprising: a wind turbine, that can be placed on a barge or land, having a tower base; a wind turbine tower hingeably attached to the tower base having a horizontal position and a vertical position; a wind turbine attached to the wind turbine tower having a hub and an outer perimeter with spokes disposed between the hub and outer perimeter; a set of vanes carried by the spokes configured to rotate the outer perimeter in response to the movement of atmospheric wind; a generator configured to engage the outer perimeter of the wind turbine and convert a rotational energy of the outer perimeter into power; a lifting tower having a pivot disposed at a proximal end of the lifting tower and having an upright position and a tilted position; a cable attached between the lifting tower and the wind turbine tower; and, wherein the lifting tower is configured to transition from the upright position to the tilted position as the wind turbine tower transitions between the horizontal position to the vertical position and a cable length between a lifting tower proximal end and the wind turbine tower is shortened.

The transitioning wind turbine can include an installation barge removable attachable to the wind turbine barge and configured to support the lifting tower. A support standard can be attached to the installation barge or wind turbine barge to support the wind turbine tower in the horizontal position. A lifting assembly can be disposed at the proximal end of the lifting tower and connected to the cable. A first distance can be included between the pivot of the lifting tower and the tower base when the wind turbine tower is in the horizontal position and a second distance included between the pivot of the lifting tower and the tower base when the wind turbine tower is in the vertical position, wherein the first distance is shorter than the second distance. Fastening means can be used to secure the wind turbine tower to the tower base when the wind turbine tower is in the vertical position. The lifting tower can include a transportation position wherein the lifting tower is tilted forward relative to the tower base.

A wind turbine tower can be hingeably attached to the wind turbine base and having a horizontal position and a vertical position. The wind turbine base can be land based or offshore. A wind turbine can be attached to the wind turbine tower; a lifting tower connected to the wind turbine tower and having an upright position and a tilted position; and, wherein the lifting tower is configured to transition from the upright position to the tilted position as the wind turbine tower transitions between the horizontal position to the vertical position. The lifting tower can also transition forward relative to the base to be generally parallel to the wind turbine tower when the wind turbine tower is in the horizontal position.

The above are further accomplished by an anchoring and lifting system for a wind turbine tower comprising a tower base; a plurality of base anchors attached to the tower base; an anchor outrigger attached to and extending laterally outward from the tower base; at least one secondary anchor attached to the anchor outrigger; a lifting outrigger attached to a hinge wherein the hinge connects the tower base and a tower for moving the tower between a raised position and a lowered position; a static cable connected between a distal end of the lifting outrigger and a hub attached to the tower; and, a lifting cable attached between the distal end of the lifting outrigger and a winch, wherein the winch is carried by the tower base.

In a further advantageous embodiment, the hinge includes at least one lateral mounting portion extending past the diameter of the tower and connecting to a proximal end of the lifting outrigger.

In a further advantageous embodiment, the base anchors are attached to a flange carried by the tower base.

In a further advantageous embodiment, the lifting cable is arranged in a block and tackle configuration.

In a further advantageous embodiment, the tower includes a lower tower portion and an upper tower portion removable attached to each other.

In a further advantageous embodiment, a first portion of the hinge is connected to said lower tower portion, and a second portion of said hinge is connected to said tower base so that said tower is pivotally carried on said tower base for moving between the raised and lowered positions.

In a further advantageous embodiment, the system includes a first lifting outrigger, a second lifting outrigger laterally spaced from the first lifting outrigger, and a lifting outrigger cross beam interconnecting the first lifting outrigger and the second lifting outrigger, and wherein a proximal end of the first and second lifting outriggers are carried on lateral mounting portions of the hinge so that the first and second lifting outriggers are disposed on opposing sides of the tower.

In a further advantageous embodiment, a first static cable extends from the hub to the distal end of the first lifting outrigger, and a second static cable extends from the hub to the distal end of the second lifting outrigger.

In a further advantageous embodiment, a first lifting cable extends from the distal end of the first lifting outrigger to the winch, and a second lifting cable extends from the distal end of the second lifting outrigger to the winch.

In a further advantageous embodiment, a first pulley is attached to a distal end of the lifting outrigger and receiving the lifting cable.

In a further advantageous embodiment, a second pulley is attached to a distal end of the anchor outrigger and receiving the lifting cable, wherein when the lifting cable is retracted by the winch the tower is moved to the raised position, and wherein when the lifting cable is extended by the winch the tower is moved to the lowered position.

The above are further accomplished by an anchoring and lifting system for a wind turbine tower comprising a tower base; a plurality of base anchors attached to the tower base; an anchor outrigger attached to and extending laterally outward from the tower base; at least one secondary anchor attached to the anchor outrigger; a lifting outrigger attached to a hinge wherein the hinge connects the tower base and a tower for moving the tower between a raised position and a lowered position; a lifting cable extending between a hub attached to the tower and a distal end of the lifting outrigger, and the lifting cable extending from the distal end of the lifting outrigger to a winch, wherein the winch is carried by the tower base.

In a further advantageous embodiment, the hinge includes lateral mounting portions extending past the diameter of the tower for connecting to a proximal end of the lifting outrigger.

In a further advantageous embodiment, the system includes a first lifting outrigger, a second lifting outrigger laterally spaced from the first lifting outrigger, and a lifting outrigger cross beam interconnecting the first lifting outrigger and the second lifting outrigger, and wherein the proximal end of the first and second lifting outriggers are carried on the lateral mounting portions of the hinge so that the first and second lifting outriggers are disposed on opposing sides of the tower.

In a further advantageous embodiment, a first pulley is attached to a distal end of the lifting outrigger and receiving the lifting cable.

In a further advantageous embodiment, a second pulley is attached to a distal end of the anchor outrigger and receiving the lifting cable, wherein when the lifting cable is retracted by the winch the tower is moved to the raised position, and wherein when the lifting cable is extended by the winch the tower is moved to the lowered position.

The above are further accomplished by an anchoring and lifting system for a wind turbine tower comprising a tower base; a plurality of base anchors attached to the tower base; an anchor outrigger attached to and extending laterally outward from the tower base; at least one secondary anchor attached to the anchor outrigger; a hinge connecting the tower base and a tower for moving the tower between a raised position and a lowered position; wherein the hinge includes lateral mounting portions extending past the diameter of the tower; a first lifting outrigger attached at a proximal end to one of the lateral mounting portions of the hinge; a second lifting outrigger attached at a proximal end to one of the lateral mounting portions of the hinge and laterally spaced from the first lifting outrigger so that the first and second lifting outriggers are disposed on opposing sides of the tower; a lifting outrigger cross beam interconnecting the first lifting outrigger and the second lifting outrigger; a first static cable connected between a distal end of the first lifting outrigger and a hub attached to the tower; a second static cable connected between a distal end of the second lifting outrigger and the hub attached to the tower; and, a lifting cable attached between the lifting outrigger cross beam and a winch, wherein the winch is carried by the tower base, and wherein when the lifting cable is retracted by the winch the tower is moved to the raised position, and wherein when the lifting cable is extended by the winch the tower is moved to the lowered position.

In a further advantageous embodiment, the base anchors are attached to a flange carried by the tower base.

In a further advantageous embodiment, the lifting cable is arranged in a block and tackle configuration.

In a further advantageous embodiment, the tower includes a lower tower portion and an upper tower portion removable attached to each other, and wherein a first portion of the hinge is connected to the lower tower portion, and a second portion of the hinge is connected to the tower base so that said tower is pivotally carried on said tower base for moving between the raised and lowered positions.

BRIEF DESCRIPTION OF THE DRAWINGS

The following description of the wind turbine will be better understood by reference to the following drawings that are incorporated and made part of the written specification:

FIGS. 9 through 12 are perspective views of various aspects of the wind turbine including the vanes carried by the spokes;

FIG. 17A is a side view of aspects of barge including the air foil carried by the barge;

FIG. 17B is a top view of aspects of the barge including the air foil carried by the barge;

Figure 1:
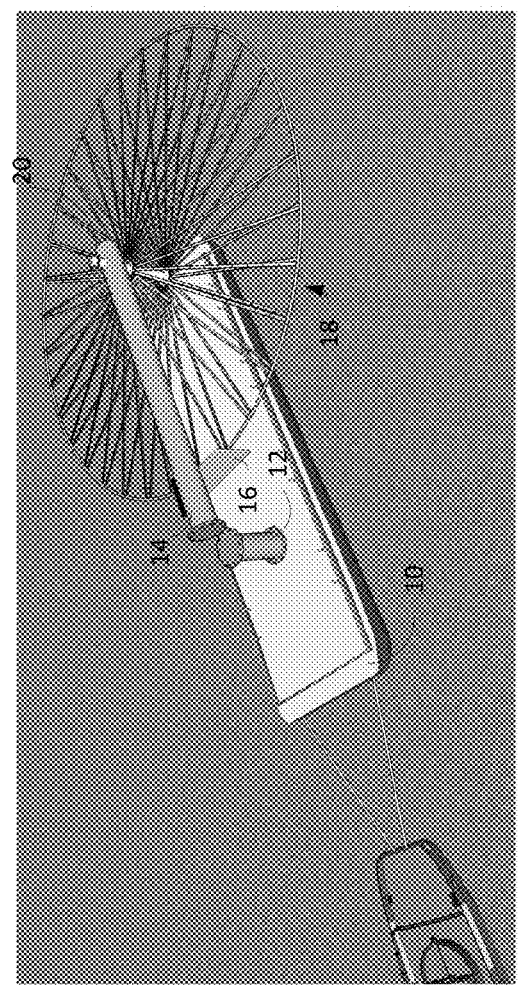
FIGS. 1 through 8 are perspective views of various aspects of the wind turbine in the horizontal and vertical positions.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF THE INVENTION

The wind turbine and related components are now described more fully herein with reference to the drawings in which some embodiments of are shown. This invention may, however, be embodied in many different forms and should not be construed as limited to the embodiments set forth herein. Rather, these embodiments are provided so that this disclosure will be thorough and complete and will fully convey the scope of the invention to those skilled in the art.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Referring to FIG. 1, a wind turbine barge 10 can include a tower base 12 that can be hingeably attached to a tower tube 14 or lattice tower or other structure. The tower tube can support a generator platform 16 configured to support a generator and a turbine wheel 18. When in the horizontal position, the tower tube hub can be supported by the barge at the distal end 20 of the tower tube. In one embodiment, an installation barge can be used to transport the wind turbine to its offshore location. The tower, in its horizontal position, can extends beyond the wind turbine barge and be supported by the installation barge.

Figure 2:
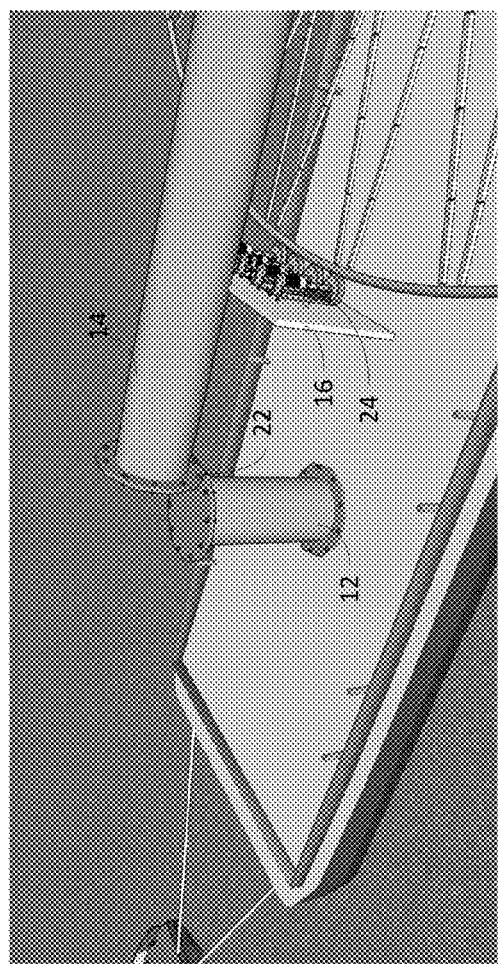

Referring to FIG. 2, the tower tube 14 can be attached to the tower base 12 with tower hinge 22. In one embodiment, the hinge can be placed inward in relation to the wind turbine barge as shown so that the tower extends over the wind turbine barge in the horizontal position. In one embodiment, the hinge can be placed outward in relation so the wind turbine barge so that the tower extends beyond the perimeter of the wind turbine barge in the horizontal position and can be supported by a installation barge. One or more generators 24 can be attached to the generator platform 16. The generator platform can be placed on the inward to outward side of the tower.

Figure 3:
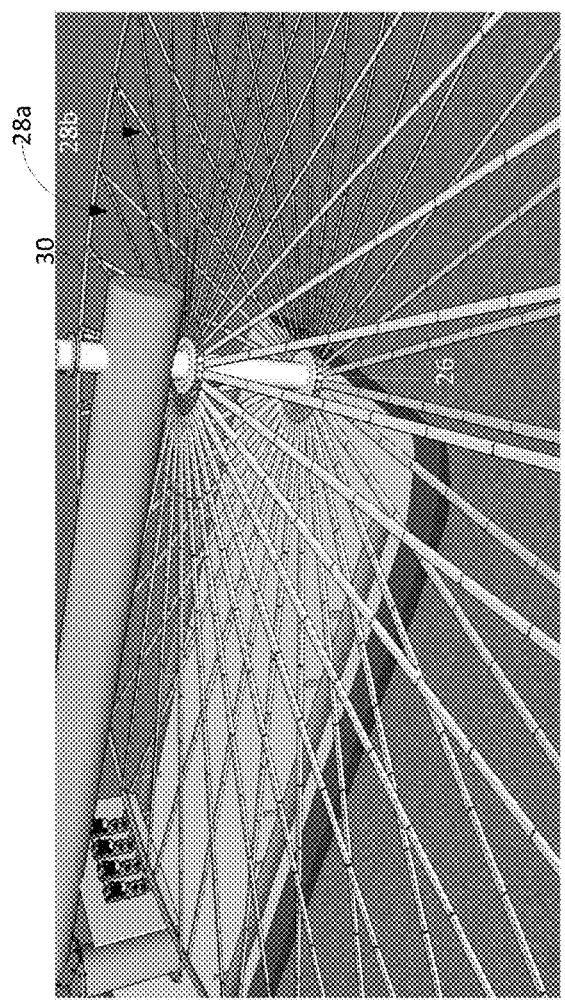
Figure 4:
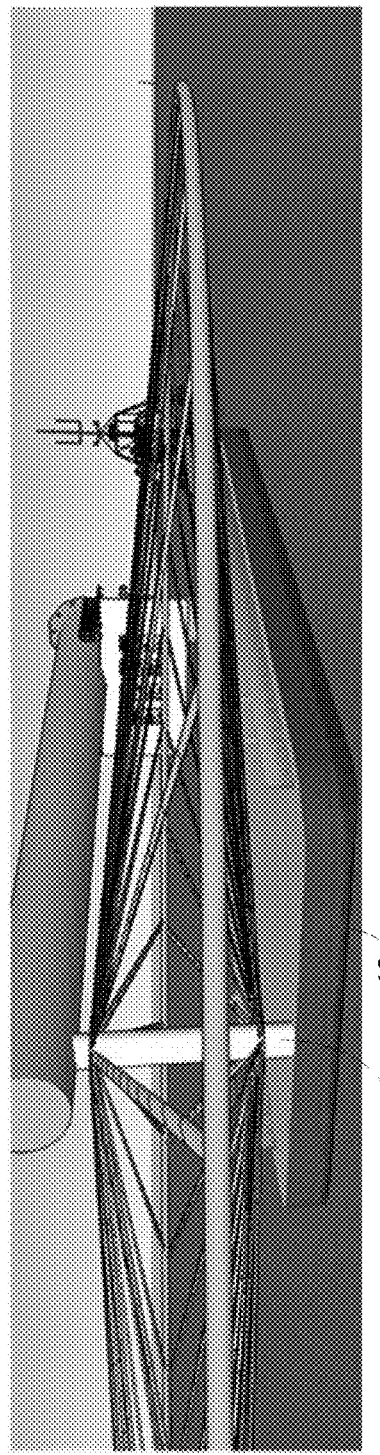
Figure 5:
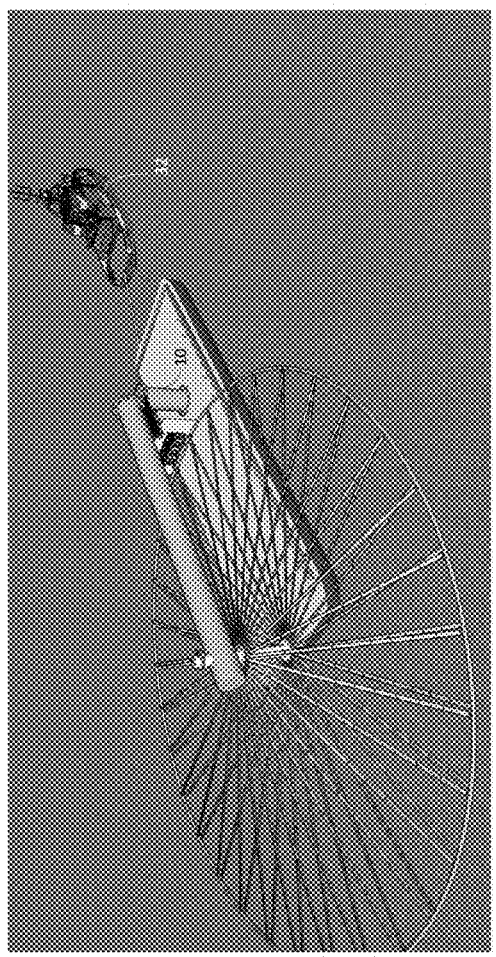
Figure 15C:
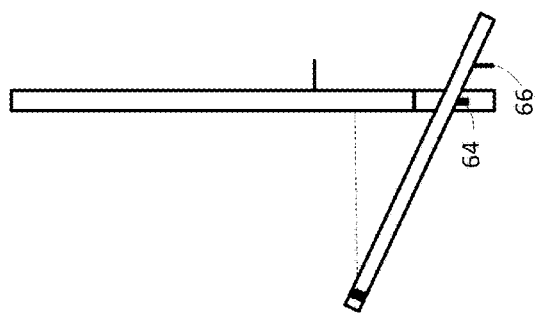
FIGS. 15A through 15F are side views of aspects of the lifting assembly.
Figure 15F:
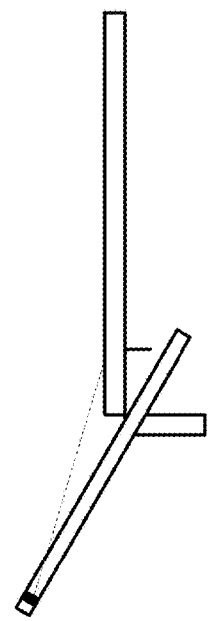
Figure 15B:
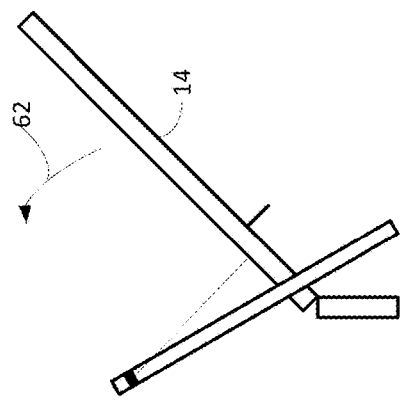
Figure 15E:
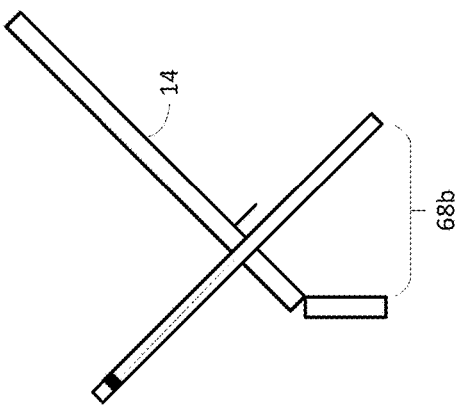
Figure 15A:
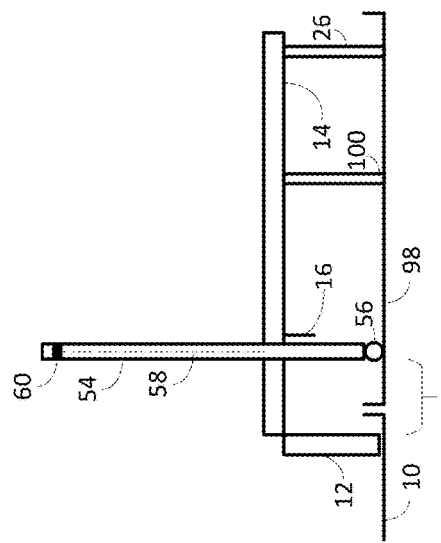

Referring to FIGS. 3 through 5, the turbine wheel can include an axle 26 with an inner set of spokes 28a and an outer set of spokes 28b. The inner and outer set of spokes are attached to the hub and to an outer perimeter 30. In the horizontal position, the various components of the turbine wheel can be accessed for construction, repair or replacement. Further, the horizontal position allows the turbine wheel to be lowered in the event of damaging weather. The axle 26 can rest against the wind turbine barge 10 when in the horizontal position. Further, the barge can be transported, such as by ship 32, when in the horizontal position. The tower can also be supported by a standard 100 (FIG. 15A) so that the axle can extend over the perimeter of the barge, in one embodiment, when in the horizontal position.

Figure 6:
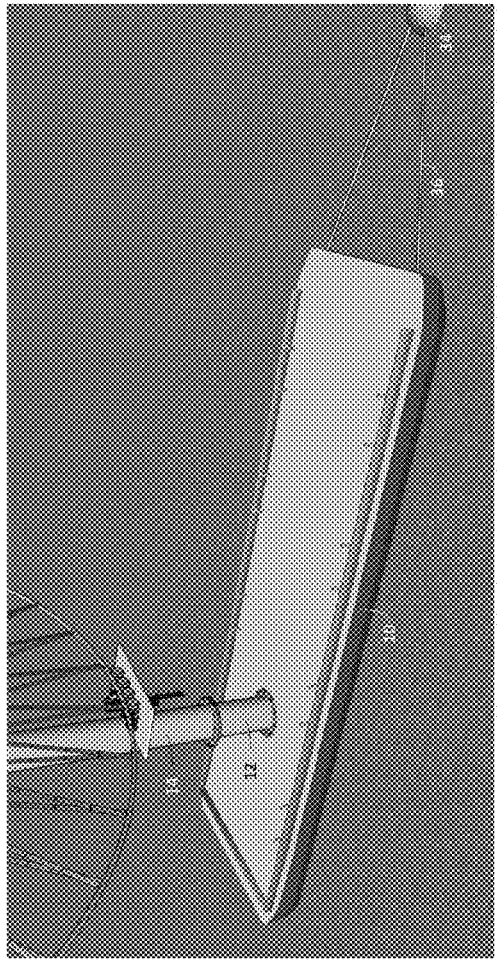
Figure 7:
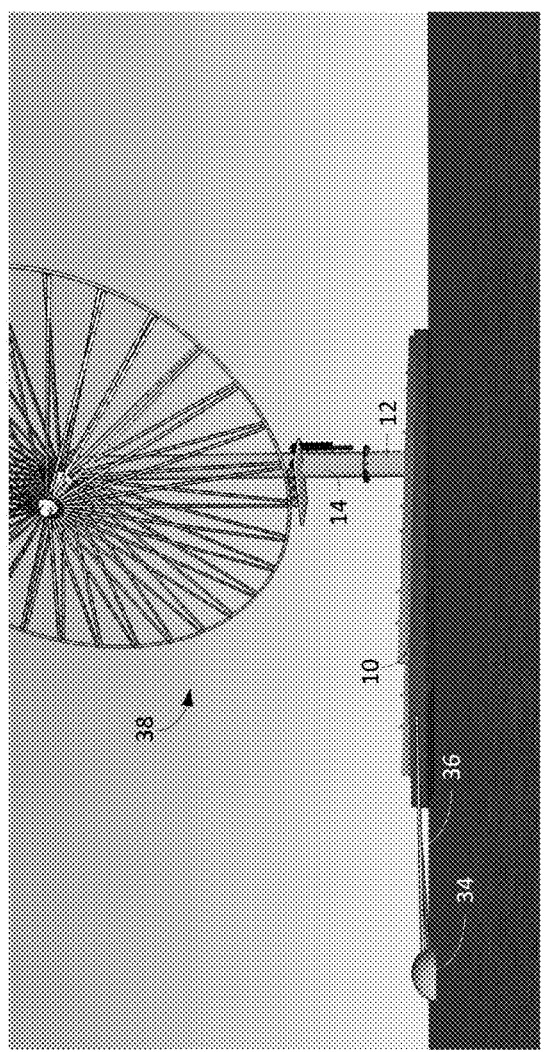
Figure 8:
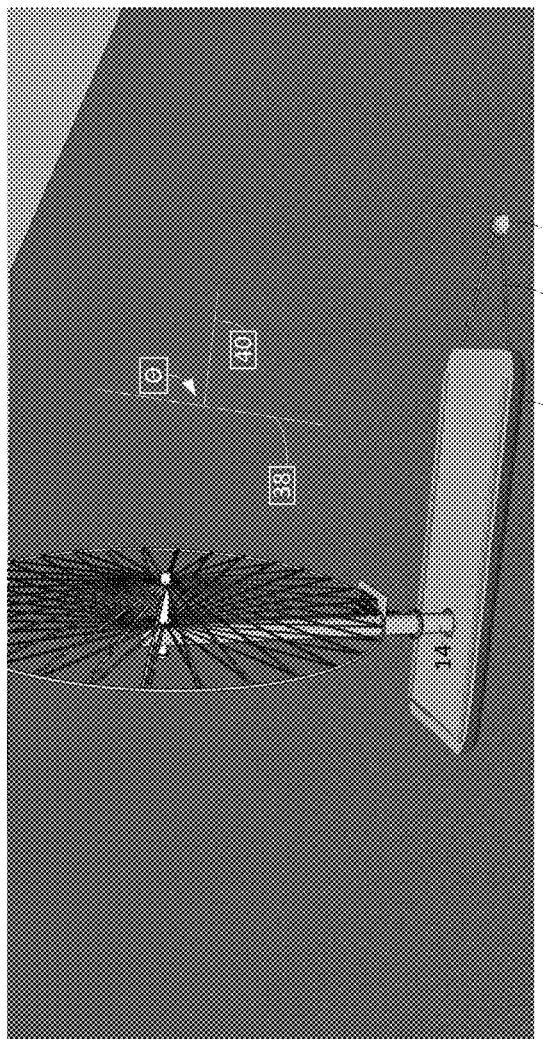
Figure 11:
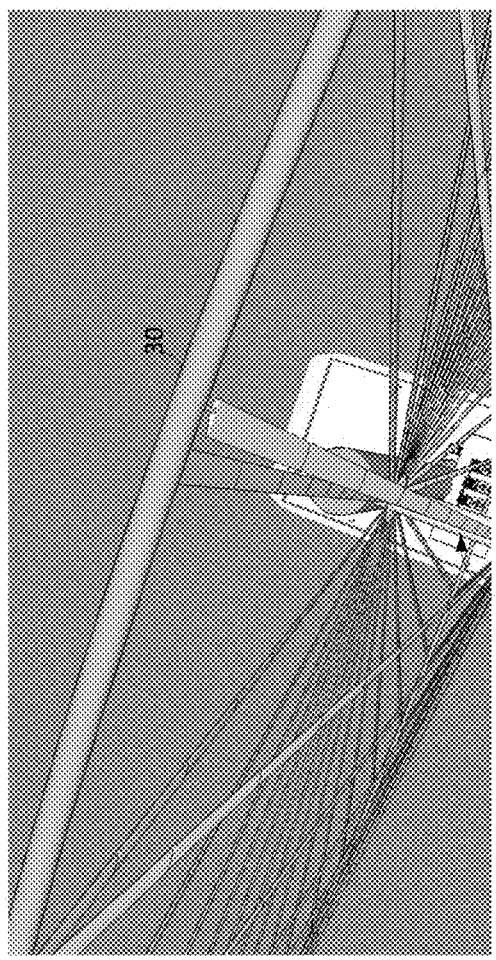
Figure 12:
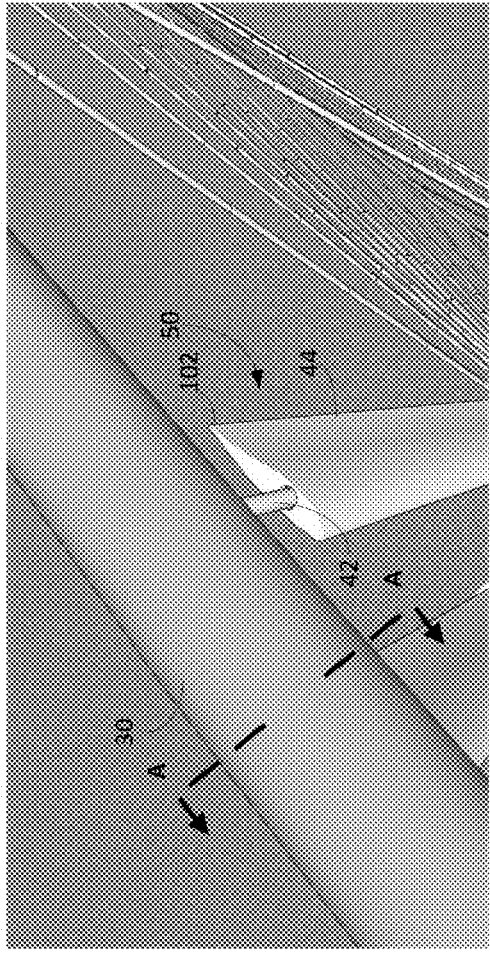

Referring to FIGS. 6 through 8, the tower tube 14 is shown in the erected position and secured to the tower base 12. When erected, the wind turbine barge 10 can be connected to a buoy 34 with lines 36. In one embodiment, the buoy is anchored to the seafloor. The lines allow the barge to rotate about the buoy so that the wind direction is into the wind turbine to assist with the proper angle of attack Θ of the wind direction 40 relative to the plane 38 of the wind turbine wheel. The angle of attack is about 90° in one embodiment.

Referring to FIGS. 9 through 12, there can be a set of vanes included in the wind turbine. Each spoke 42 can carry a sub-set of vanes. The sub-set of vanes can include a distal vane 44 that is disposed adjacent to the perimeter. Each vane can have a general wing shape 50. The sub set of vanes, having one or more vanes, can be disposed along the spoke to generally cover the entire spoke. The vanes can independently rotating relative to each other along their spoke and are cooperatively associated to have different angles of attack relative to the oncoming wind to account for the different wind speeds along the spoke. The vanes can include an upturned portion 102 at the trailing edge of the vane. The set of vanes can provide a similar benefit previously provided with blade twist 46 of conventional blades without the need for long blades. The spokes can be attached to a hub flange 48 that rotates about the axle. The outer perimeter 30 can have a circular or oval cross section along AA, in one embodiment.

Figure 13:
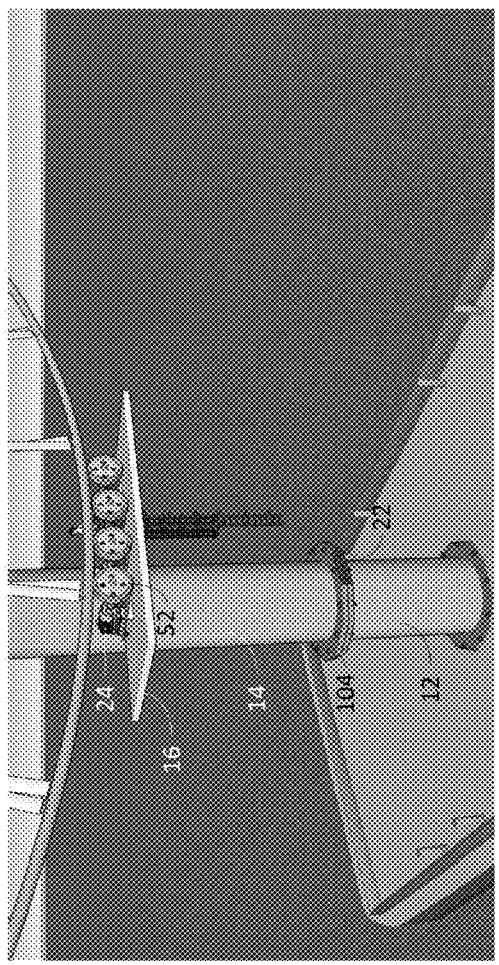
FIGS. 13 and 14 are perspective views of aspects of the wind turbine including the generator and generator platform carried by the tower.
Figure 14:
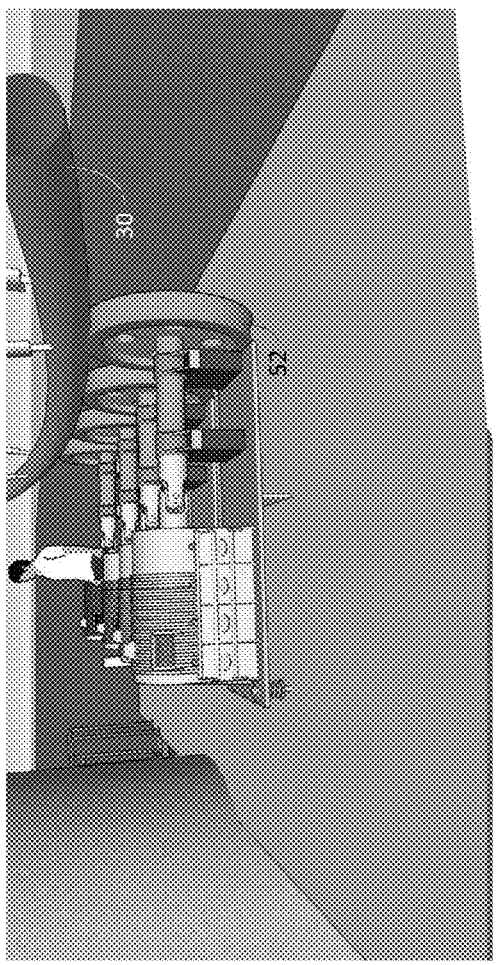

Referring to FIGS. 13 and 14, the tower tube is shown in the erected position with the tower tube affixed to the tower base. The generator platform can support one or more generators 24. The generators can include a generator wheel 52 that can engage with the outer perimeter 30 so that when the outer perimeter rotates, the generator wheel rotates causing the generator to provide power such as electricity. In one embodiment, the generator wheel can have a concave outer surface that can engage with the outer perimeter having a circular or oval cross section. Fastening means 104 can be used to secure the tower to the tower base. Fastening means can include bolts, nuts, welds, screws, latches, snaps, clamps, rivets, and the like.

Referring to FIGS. 15A through 15F, the tower tube 14 can be hingeably attached to the tower base 12. One or more lifting towers 54 can be pivotally attached to the barge at pivot 56. A cable 58 can be attached to a winch, block and tackle or other lifting assembly 60 that can be attached to the distal end of the one or more lifting towers. The cable can be attached at or near the generator platform 16. When the lifting assembly retracts the cable, the tower tube is pulled in a direction 62 and the lifting towers transition rearward. In one embodiment, the cable stays generally perpendicular to the tower tube when the tower tube is being raised. When the tower is in the erected position for operations, the lifting tubes rest on a stop 64 that can be attached to the tower base or otherwise carried by the barge (as shown by 66) to prevent the lifting tubes from over rotating.

Figure 15D:
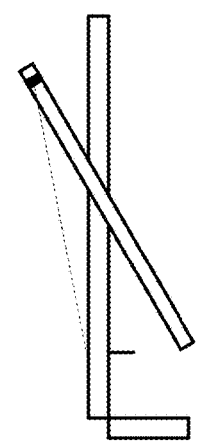
Figure 16A:
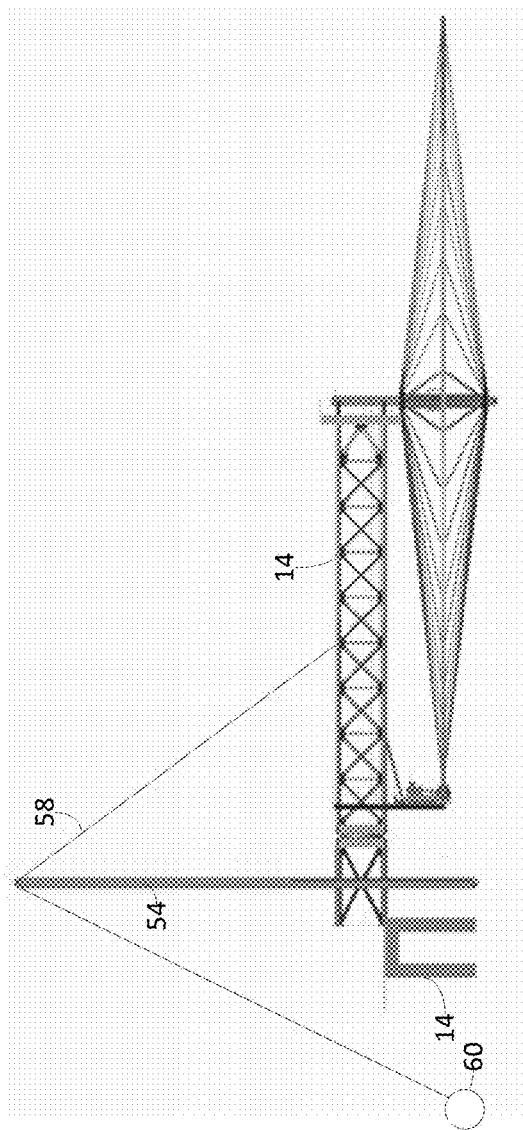
FIGS. 16A through 16D are side views of aspects of the lifting assembly.
Figure 16B:
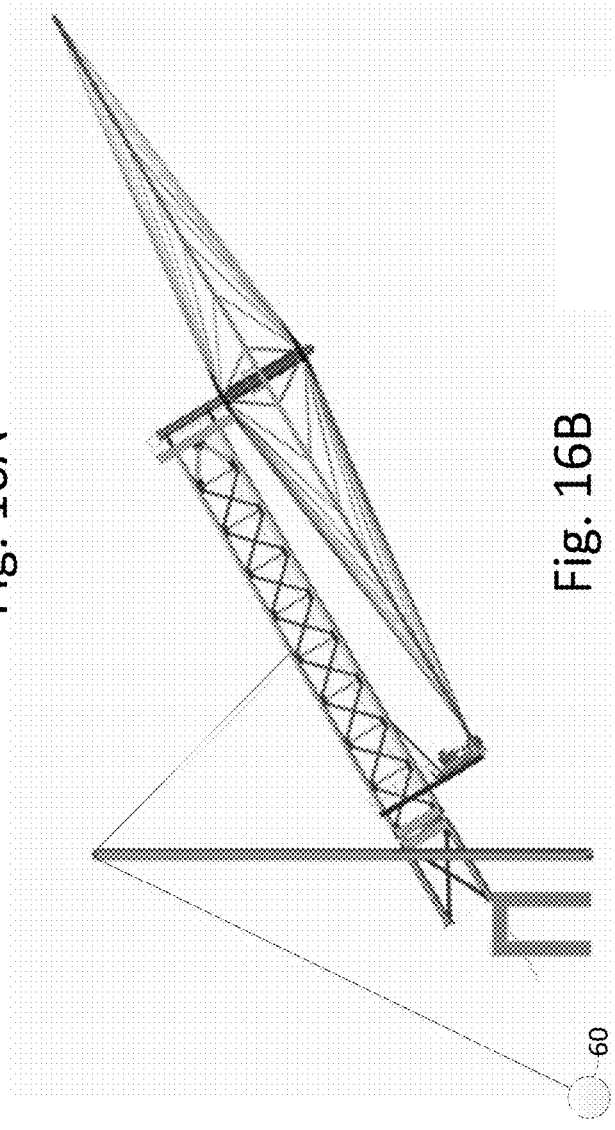
Figure 16C:
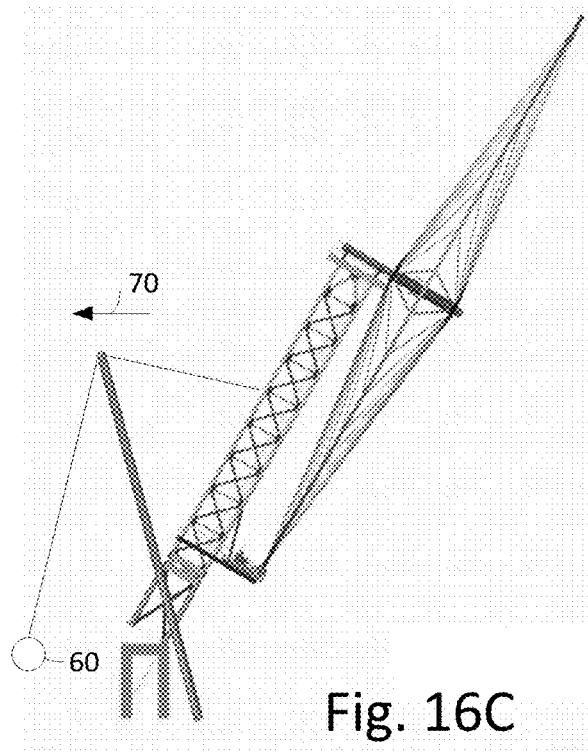
Figure 16D:
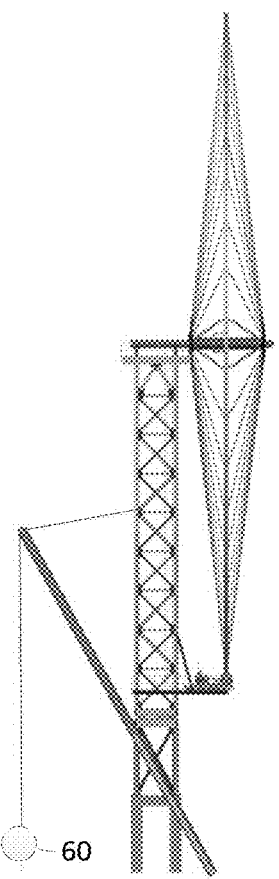
Figure 16E:
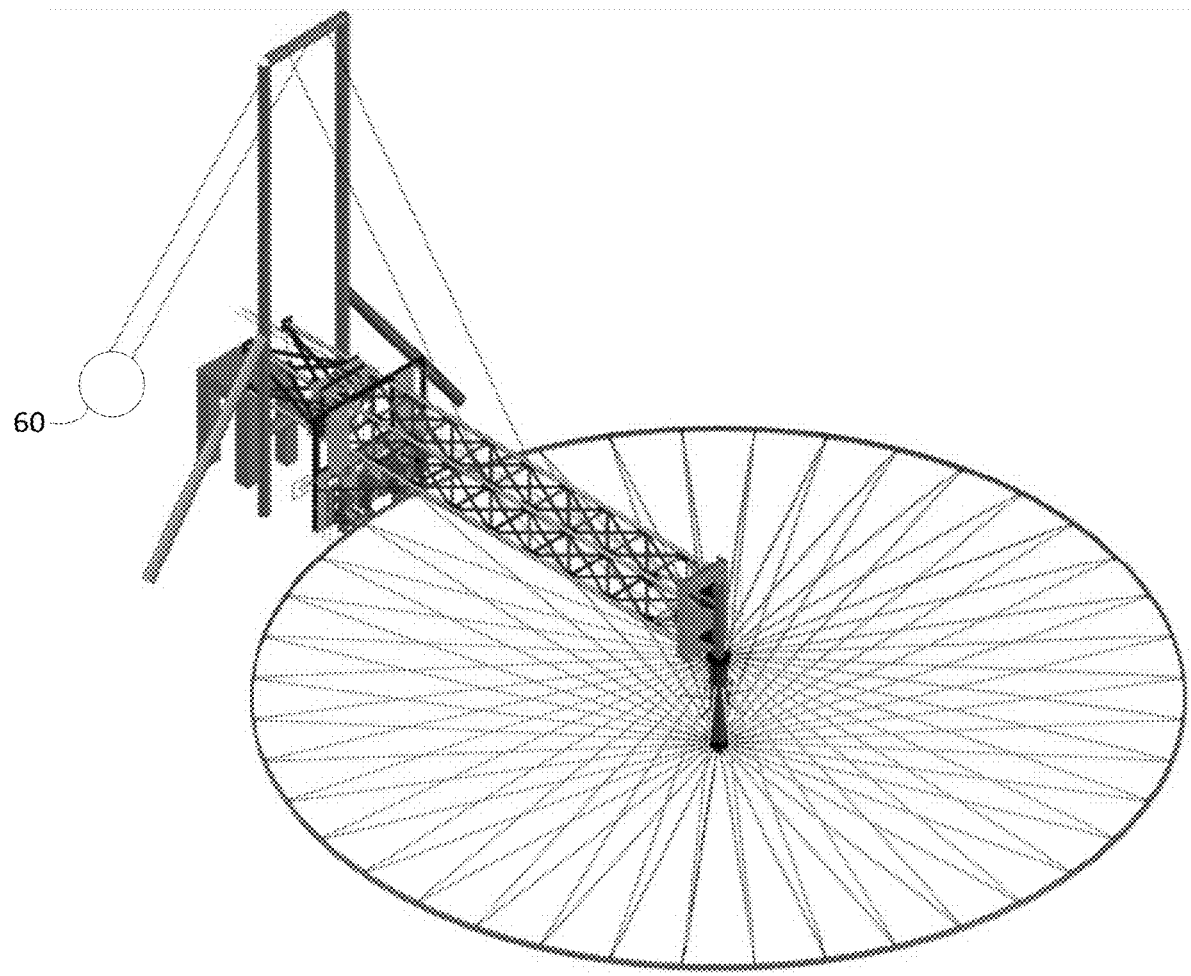
FIG. 16E is a perspective view of aspects of the assembly including the lifting assembly.

When the tower tube is in the horizontal position, the cable can be let-out enough to allow the lifting tubes to be positioned forward for transportation so that the tower tube and lifting tubes are generally in a horizontal configuration as shown in FIG. 15D. In one embodiment, the lifting tower can slide along the barge so that the cable is maintained generally perpendicular to the tower tube during the lifting of the tower tube. The distance between the tower base, or a wind turbine attachment point, and the lifting tube can increase as the tower tube is raised as shown by 68a (horizontal tower tube) and 68b (raised tower tube). The attachment point can be where the wind turbine tower attaches to the barge or a land-based foundation, the tower base or other support.

In one embodiment, the pivot of the lifting tubes maintains the cable generally perpendicular to the tower tube. The top of the lifting tubes can be constantly moving when the tower tube is being raised so that they are moving toward the tower tube. The cable(s) between the lifting tubes and the tower tube stay perpendicular between the tower tube and the lifting assembly as the lifting tubes move at an angle to the tower tube. Once the tower tube is raised, the lifting tubes, and cables, can stay in place. The tower tube can then be bolted to the tower base. To lower the tower tube, the weight of the tower tube and wind turbine will start the lowering process to the barge where the lifting tubes will be generally vertical and the tower tube generally horizontal. The lifting tubes can then be placed rearwards until they reach about 20° to 30° in one embodiment. The lifting tubes can rest on stops that are attached to the tower base or otherwise carried by the barge.

Referring to FIGS. 16A through 16E, one embodiment of a lifting system is shown. The wind turbine tower 14 is hingeably attached to the tower base 12. The lifting tower 54 can be pivotally attached to the barge and have cables 58 attached to the tower such as with ah pulley between the cable and the top of the lifting tube. A lifting assembly 60 can cause the cable to retract. As the cable retracts, the tower is lifted toward a vertical direction. The lifting tubes can rotate rearwards in a direction 70.

The lifting tubes can be hinged to the barge deck where they can be located on each side of the wind turbine tube about 40 feet, in one embodiment, from where the main tube hinges (standing vertical just below the generator platform when the wind turbine is laid down). The cable can travel down to the tower tube so that when the wind turbine is raised, the cable is perpendicular to the tower tube. The lifting tubes can include a block and tackle that extend out past the tower tube and can be disposed at an angle so that when the wind turbine is in the horizontal position, the lifting tubes are vertical. When the cable is let out, the lifting tubes can rotate toward the stern of the barge until they are in a shipping position.

Figure 18A:
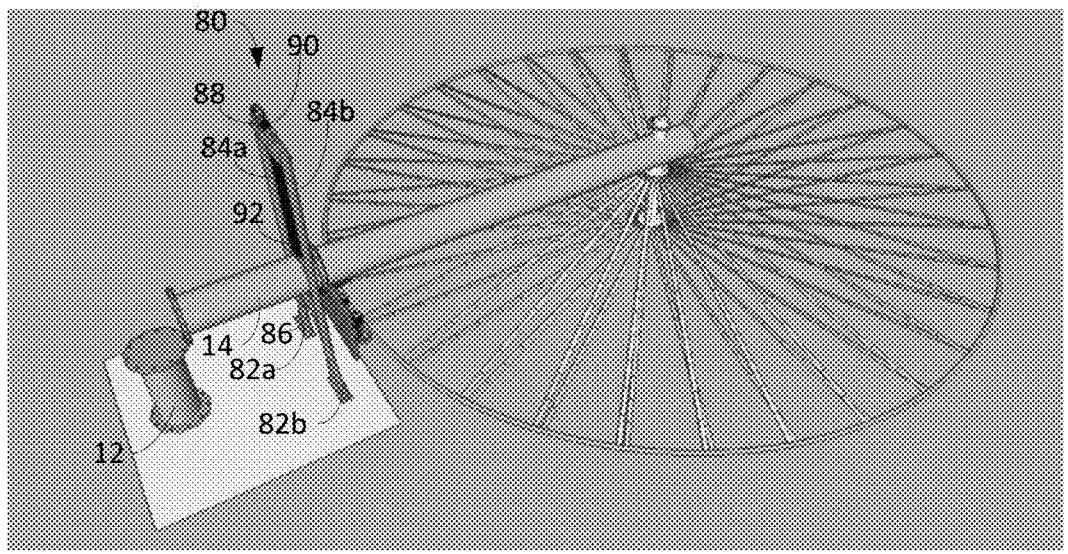
FIGS. 18A through 18D are perspective views of aspects of the wind turbine and other components.
Figure 18B:
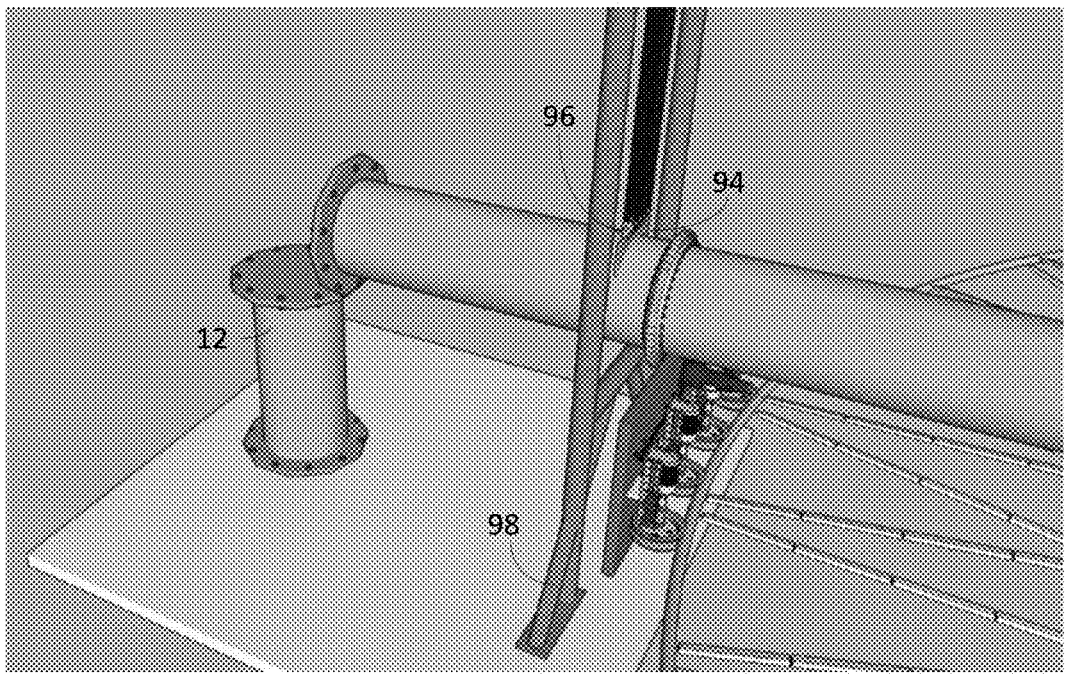
Figure 18C:
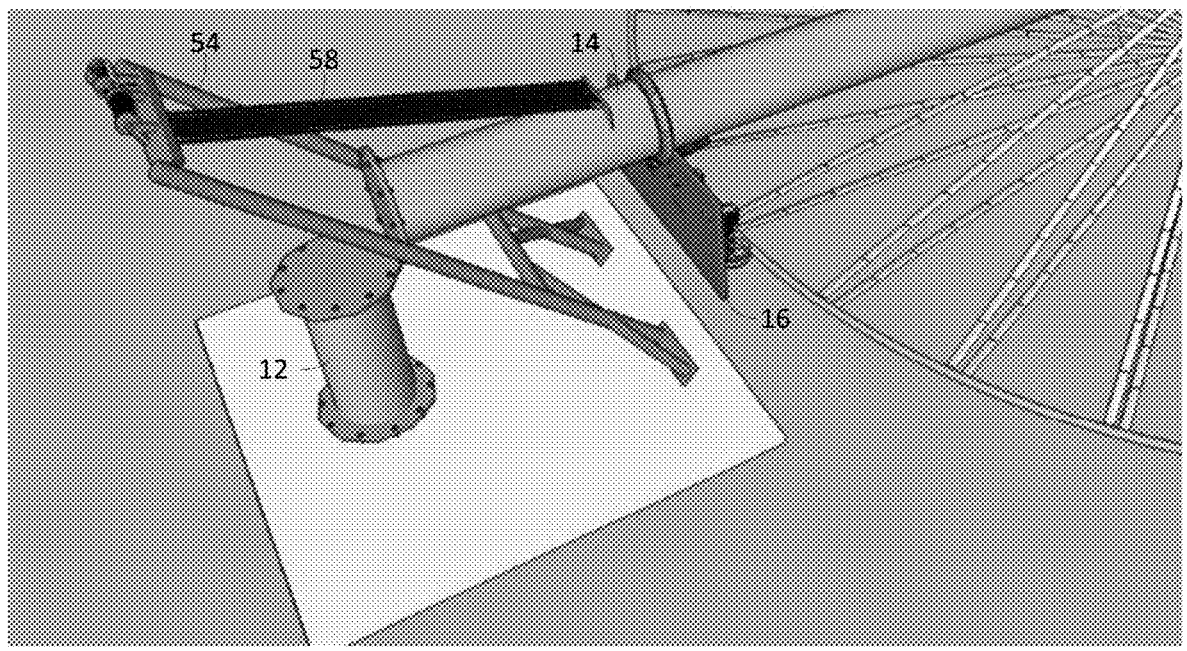
Figure 18D:
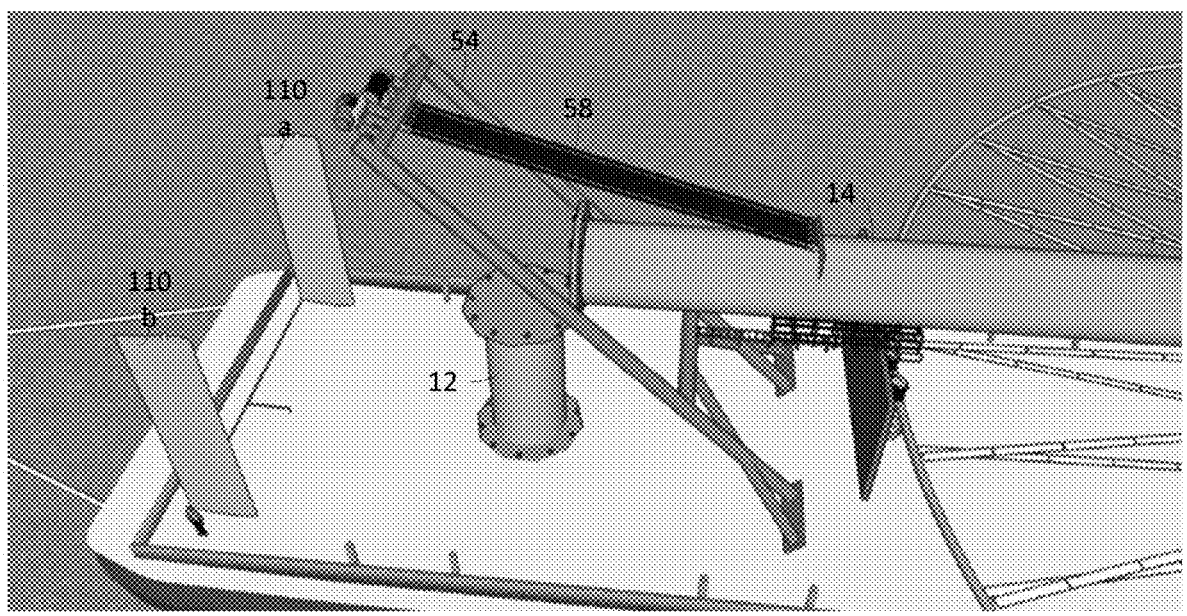

Referring to FIGS. 17A and 17B, one embodiment is shown with an air foil 72 attached to the stern of the barge. When the wind turbine rotates, the gyroscopic effect tends to rotate the wind turbine out of the optimal angle of attack in relationship to the wind direction 40. Placing the air foil on the stern provides for the air foil to bias the barge in the opposite direction of the rotation caused by gyroscopic effect without the need for thrusters. When the gyroscopic force tends to rotate the barge and wind turbine in a direction shown as 74, the wind also biases the air foil 110 to be positioned in line with the wind along path 76 which in turn tends to move the barge in a direction 78 thereby counteracting the gyroscopic effect. Referring to FIGS. 18A and 18C, the wind turbine can be land-based. Referring to FIG. 18D, the offshore wind turbine can include a pair of air foils 110a and 110b carried by the barge.

The design of the assembly has multiple benefits and features including: removal of the conventional gearbox, removal of the conventional yaw bearing, removal of the conventional electrical slip rings, removal of the conventional large single length blades and thus reducing blade fatigue, simple blade/vane replacement, removal of the blade pitch system, the ability to mount the wind turbine on the barge without an ocean floor support structure, simple barge anchoring system, no specialized setup ships, the ability to conduct assembly on land or at docks, the ability to assemble in a horizontal position, the ability to perform maintenance at dock, the provide hurricane avoidance which can reduce insurance costs, removal of oil, eliminating the risk of oil burning/fires, removal of fiberglass nacelle that can also burn, simplistic raising and lowering of the wind turbine, reduction of the detrimental effects of wheel/rim inertia, increase in the diameter of the wind turbine wheel due to use of a set of vanes, removal of stern thrusters, can be located relative close to reverse osmosis equipment, and the placement of electrical equipment below deck. With the elimination of the top most expensive and most complicated components (e.g. gearbox, yaw drive, blade pitch system, electrical slip rings, large blades, sea floor structure, setup ships) the ongoing maintenance will be a fraction of the effort, complexity and costs of conventional offshore wind turbine systems.

Figure 19:
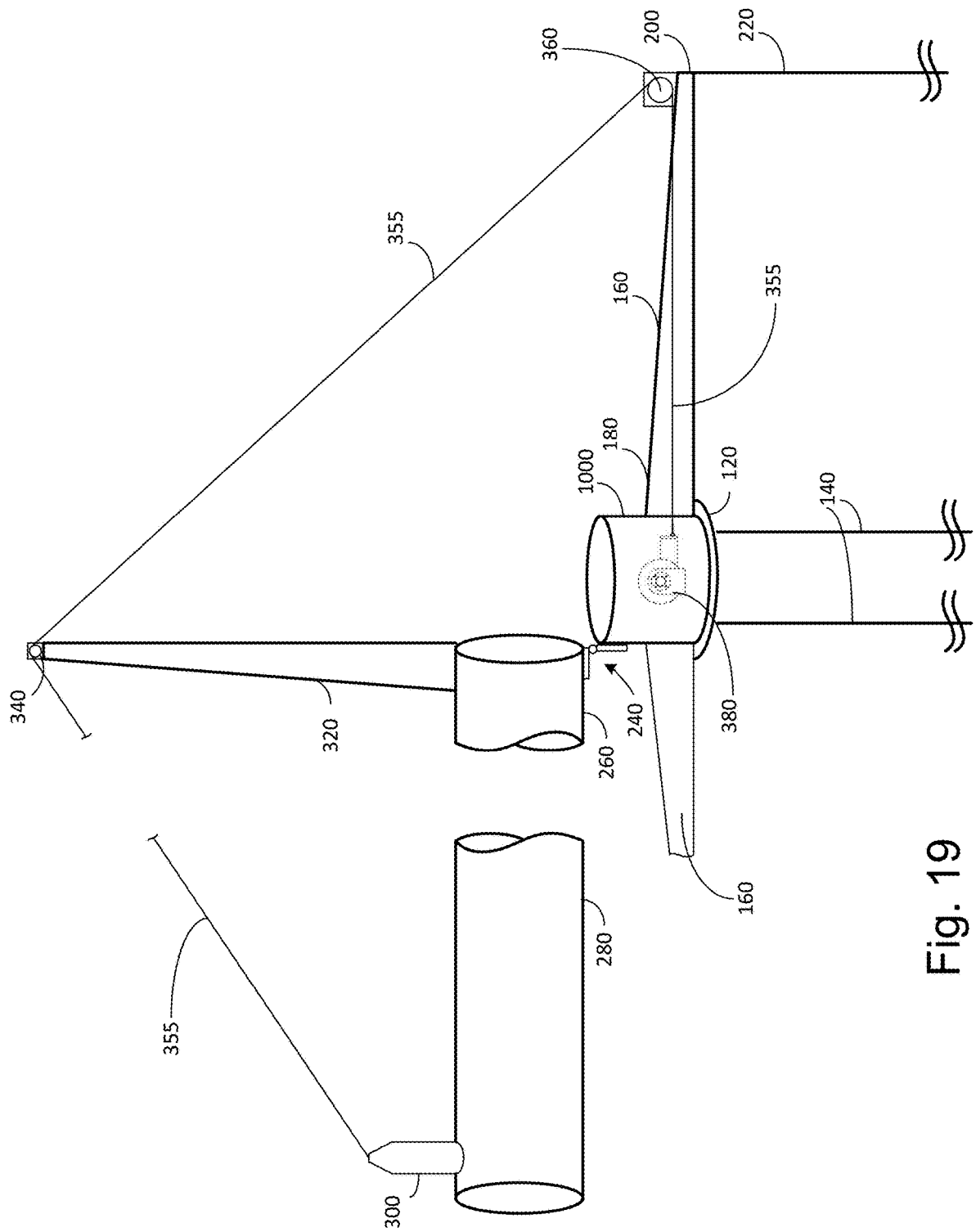
FIG. 19 is perspective view of aspects of the system.

Referring to FIG. 19, a wind turbine tower can include a tower base 1000 that can include a flange 120. Base anchors 140 can be inserted into the underlying ground with a top portion of the anchor attached or secured to the tower base and flange. The anchor can prevent the downward force on the base from pushing the tower base undesirably into the ground. The anchors can be taken from the group of helix anchors, resistance piers, expanding rock anchors, pole key anchors, duck bill anchors, bust anchors and any combination thereof.

Figure 23:
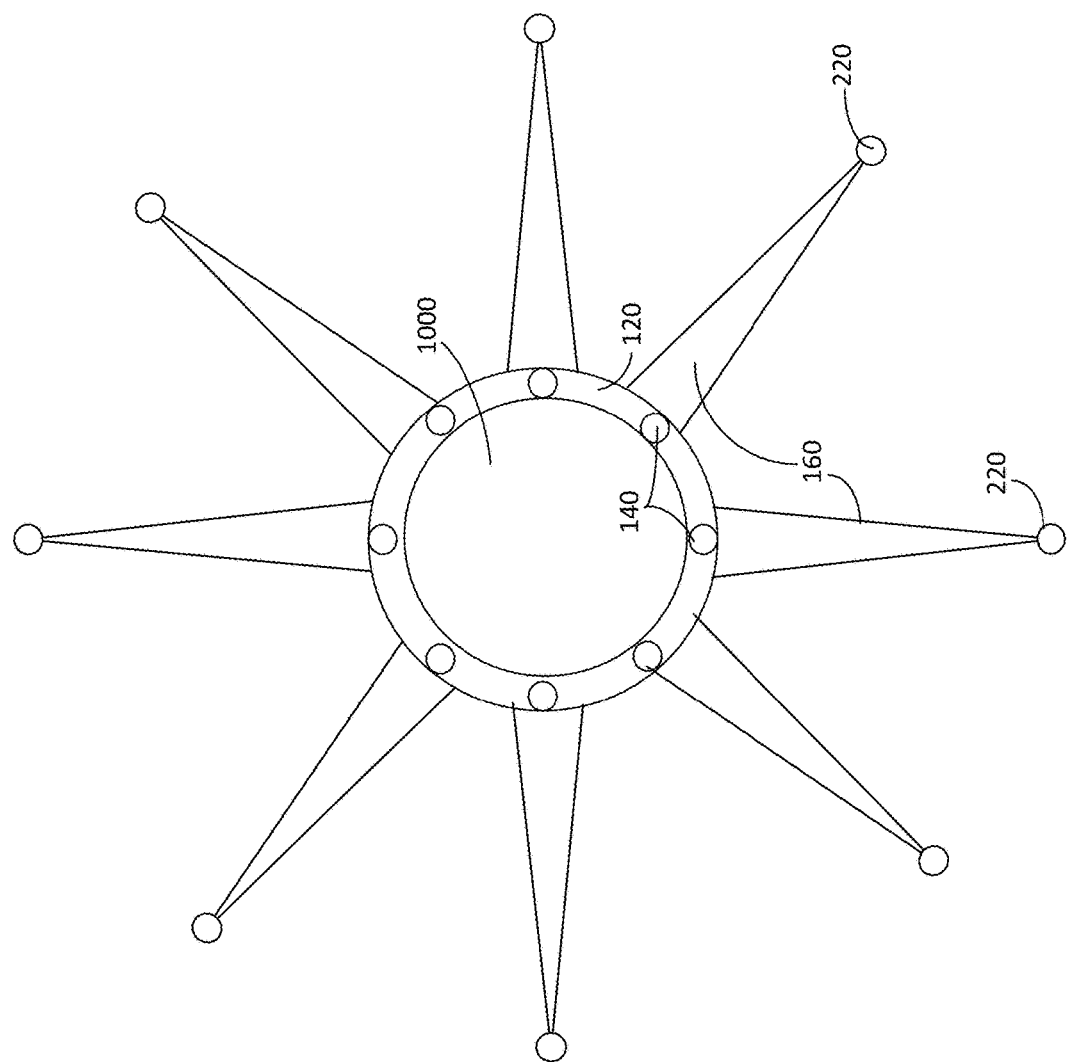
FIG. 23 is a top view of aspects of the system.

The tower base can have an anchor outrigger 160 attached to the tower base that includes a proximal portion 180 and a distal portion 200. The distal portion can be attached to a distal secondary anchor 220 that is inserted into the underlying ground. The tower base can include a series of anchor outriggers 160 extending radially from the tower base as shown in FIG. 23. The tower can include a hinge 240 that can be attached to the tower base and a lower tower portion 260. The upper tower portion 280 can be connected to the lower tower portion to form the wind turbine tower. The lower portion can be attached to the upper tower portion with bolts and nuts, welding or other connection structure and methods. The tower can include a hub 300 about which a wind turbine wheel can rotate such as shown in United State Patent Application 20210156359 which is owned by the inventor herein and incorporated by reference.

Figure 24:
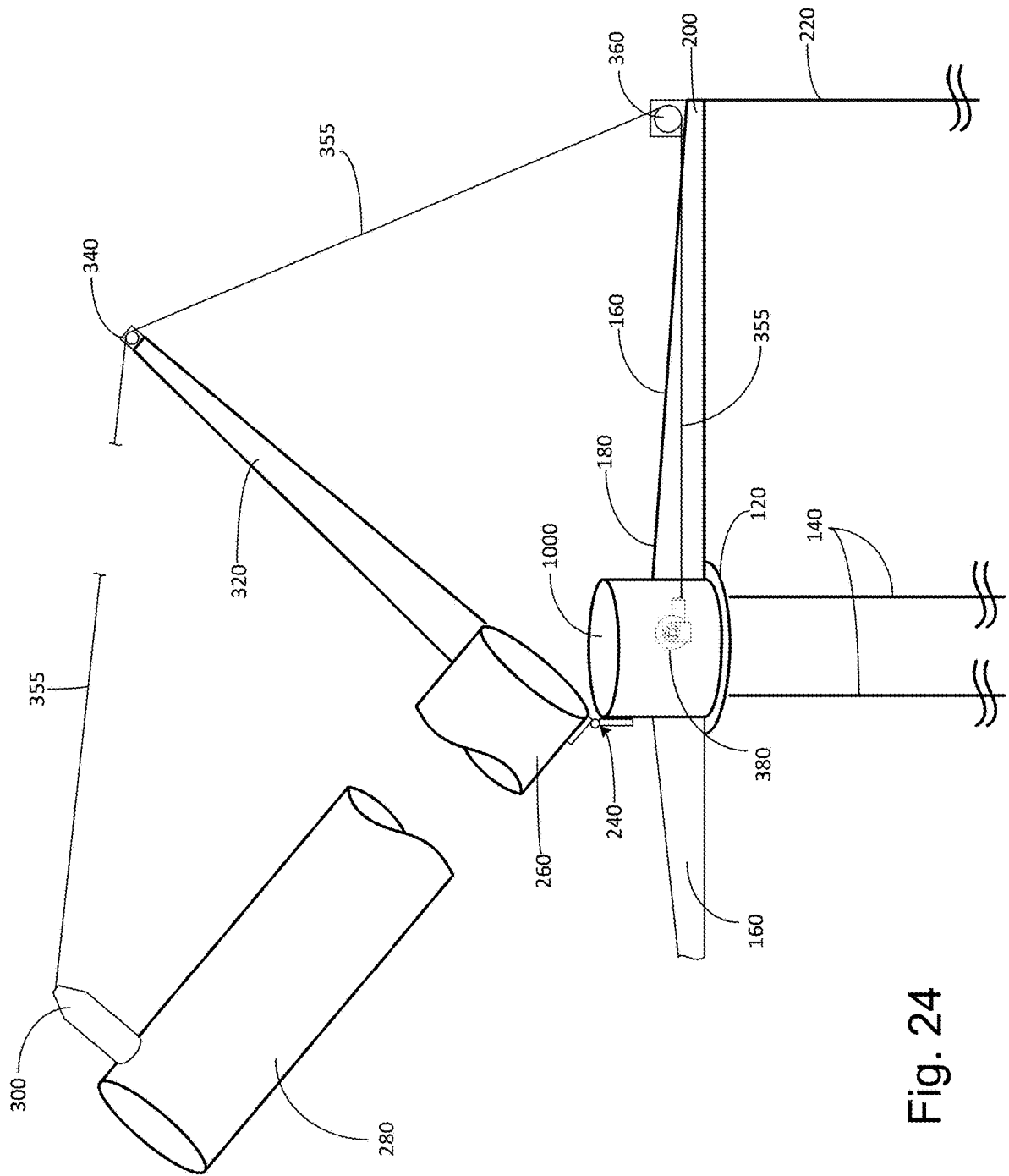
FIG. 24 is perspective view of aspects of the system.
Figure 26:
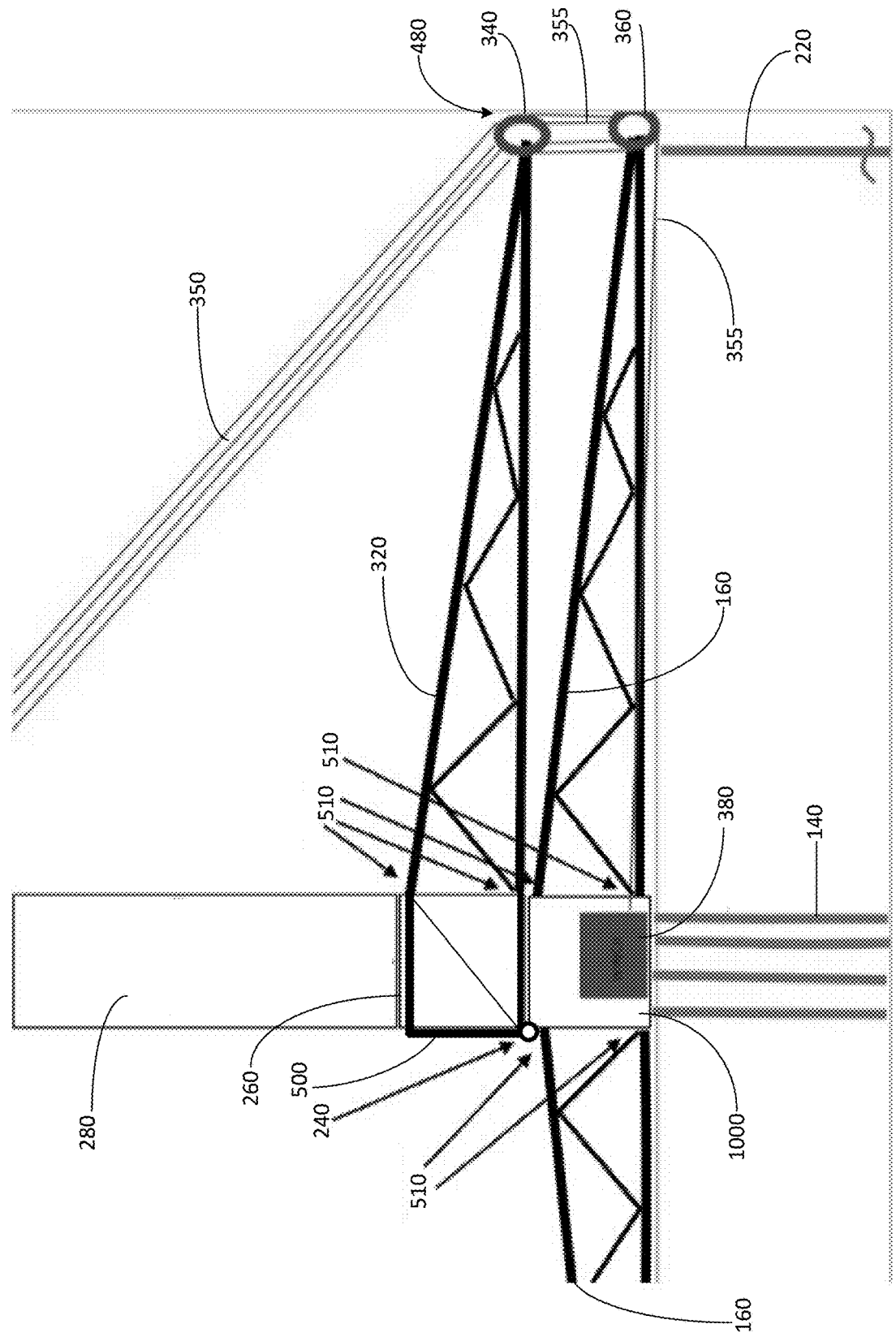

A lifting outrigger 320 can be attached to the lower tower portion. A lifting outrigger idler (or pulley) 340 can be attached to a distal end of the lifting outrigger. An anchor outrigger idler (or pulley) 360 can be attached to one or the outriggers and in one embodiment the outrigger opposite the attachment point of the hinge 240. A cable 355 can be attached to the hub 300, run through, around or across the lifting outrigger idler, run through, around or across the outrigger idler and be attached to a winch 380. The winch can be contained in the tower base. When the winch draws the cable into the tower base, around the winch, or into the winch, the tower is transitioned into a raised position. As shown in FIG. 24, the tower is partly raised as it transitions into a fully raised position as shown in FIG. 26. The lower tower portion can then be secured to the tower base. When the lower tower portion is disconnected from the tower base and the cable is release by the winch, the tower can be lowered.

Figure 20:
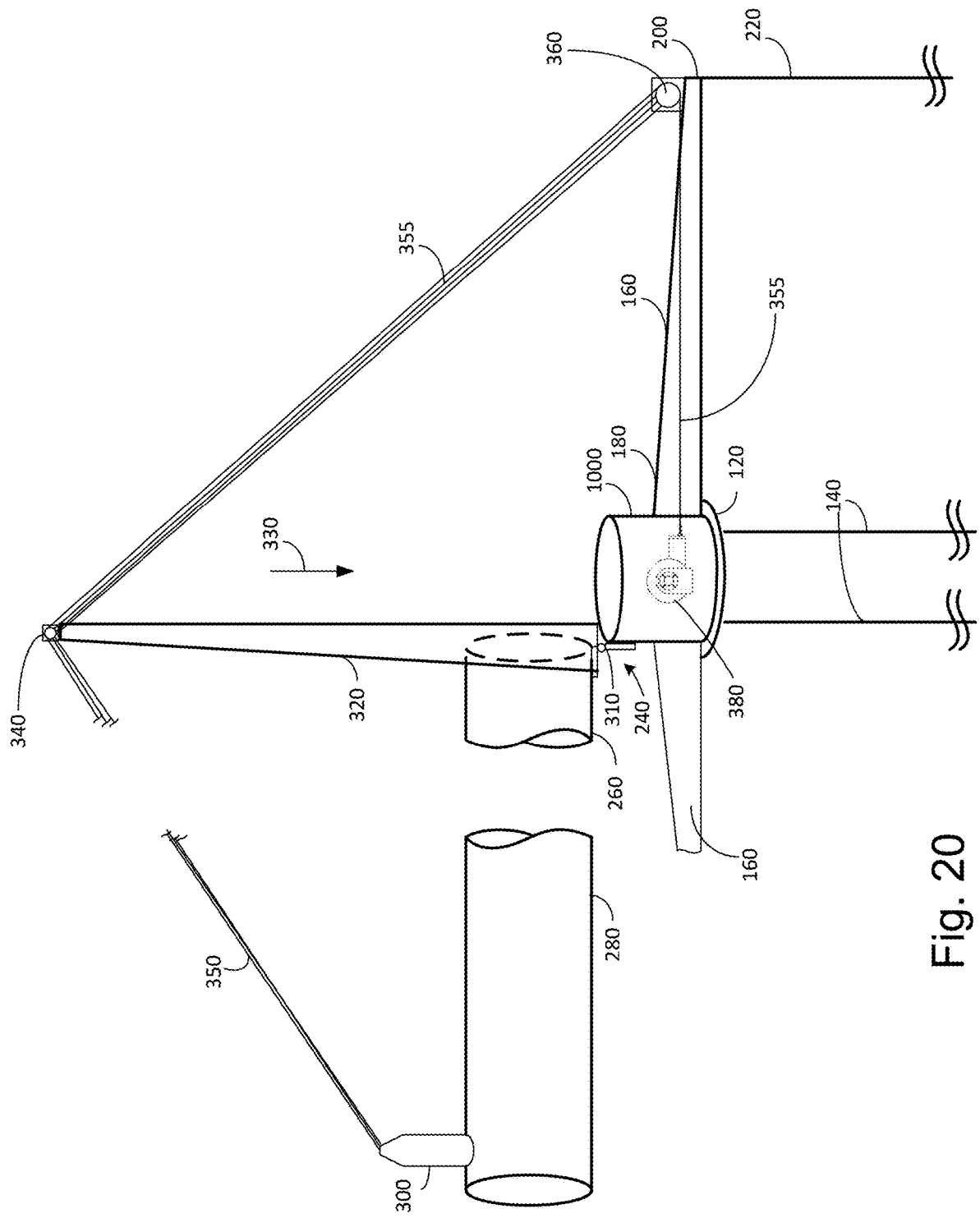
FIG. 20 is perspective view of aspects of the system.

Referring to FIG. 20, the lifting outrigger 320 can be connected to the hinge 240. In the embodiment, one component of force placed on the lifting outrigger (shown as 330) is placed on the hinger rather than the tower base or the tower components. In this embodiment, the hinge pivot 310 can extend away laterally from the hinge so that the hinge pivot or other component of the hinge is disposed outside the perimeter or the tower. One or more lifting outriggers can be used. A static cable 350 can be attached from a distal end of the lifting outrigger and the hub 300. One or more static cables can be attached from the lifting outrigger to the hub. The lifting cable(s) 355 can be attached to the distal end of the lifting outrigger and used to raise and lower the tower. The lifting cable can be in a block and tackle configuration. In one embodiment, a first lifting outrigger can be disposed on one side of the tower and a second lifting outrigger can be disposed on the other side of the tower.

Figure 21:
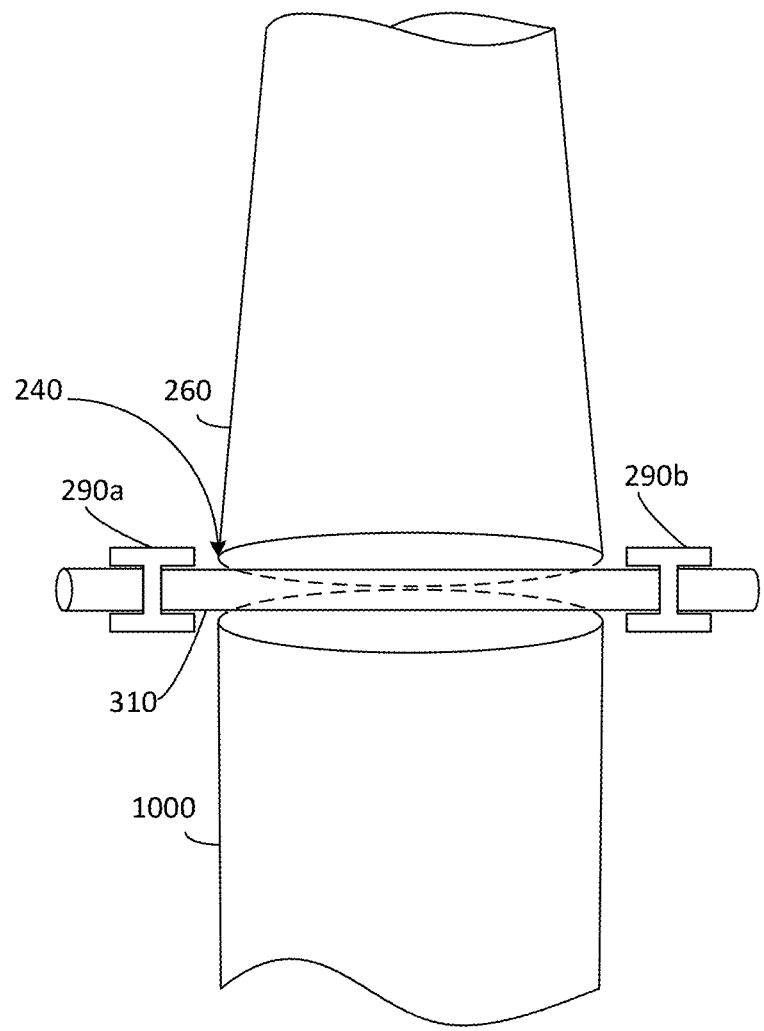
FIG. 21 is perspective view of aspects of the system.

Referring to FIG. 21, the lower tower portion is shown connected to the tower base 1000 with hinge 240. A first lifting outrigger 290a (shown in cross section) can be attached to one side of a hinge pivot 310 and a second lifting outrigger 290b can be attached to the other side of the hinge pivot 310.

Figure 22A:
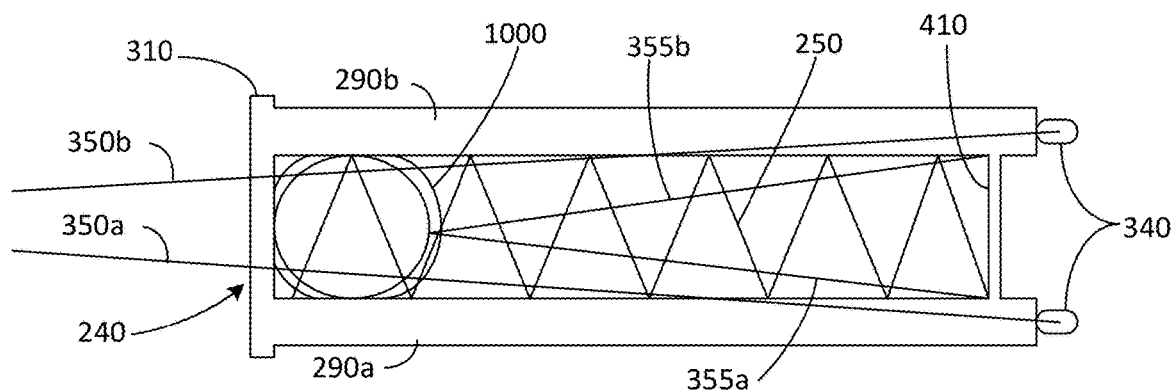
FIG. 22A is a top view of aspects of the system.

Referring to FIG. 22A, a top view is shown with the tower base 1000 attached to hinge 240 and outriggers 290a and 290b. A support structure 250 (e.g., lattice structure) can connect the first lifting outrigger to the second lifting outrigger. First lifting outrigger 290a and second lifting outrigger 290b are attached to lateral mounting portions of the hinge 240 that extend past the diameter of the tower. One or more static cables 350a and 350b can extends from the distal end of each lifting outrigger to a hub 300 (FIG. 20) so when the lifting outrigger is moved from a vertical position to a horizontal position, the tower or a portion of the tower is raised. In one embodiment, a cross beam 410 beam can be used to attach the distal end of the lifting outriggers together. A first lifting cable 355a can be attached to the first lifting outrigger and a second lifting cable 355b can be attached to the second lifting outrigger.

Figure 22B:
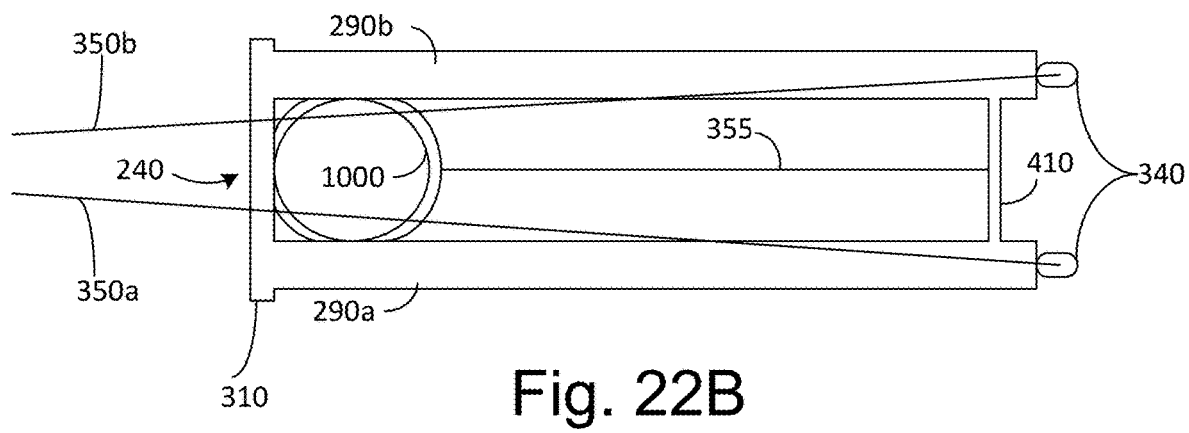
FIG. 22B is a top view of aspects of the system.

Referring to FIG. 22B, the lifting cable 355 can be attached to one or more lifting outriggers. In one embodiment, the lifting cable 355 can be attached to a lifting outrigger cross beam 410. The lifting outrigger cross beam can be connected between the first lifting outrigger 290a and the second lifting outrigger 290b to provide support.

Figure 25A:
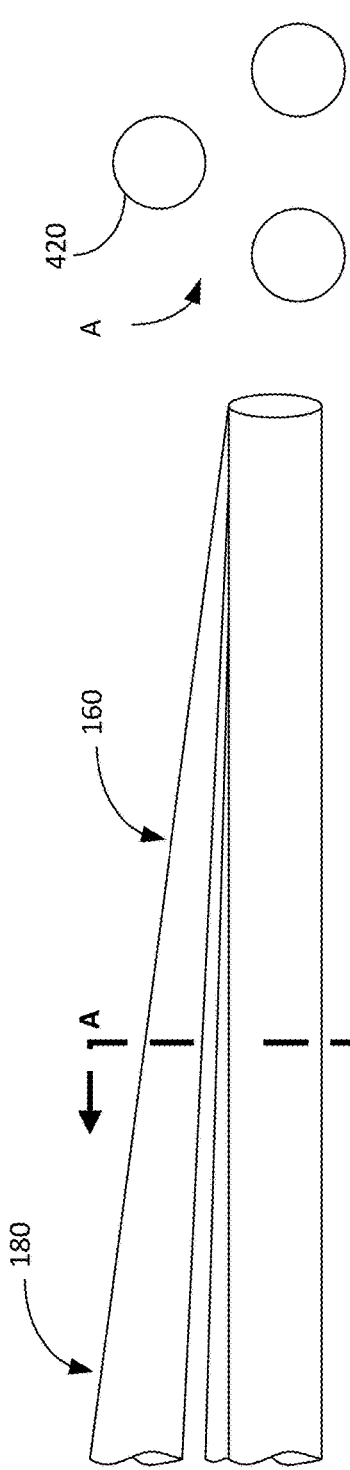
FIG. 25A is a side view and cross section of aspects of the system.
Figure 25B:
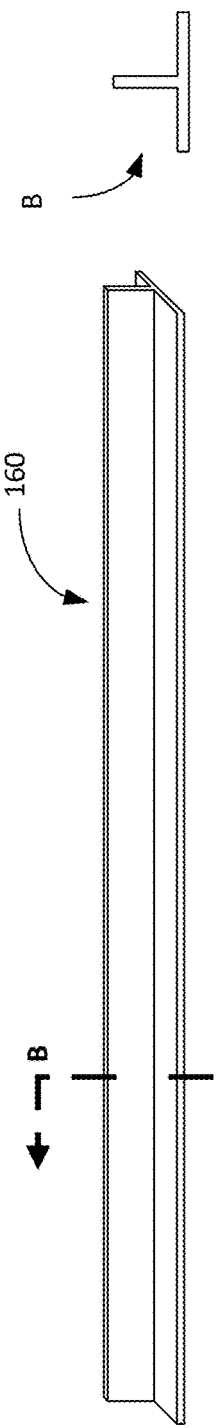
FIG. 25B is a side view and cross section of aspects of the system.
Figure 25C:
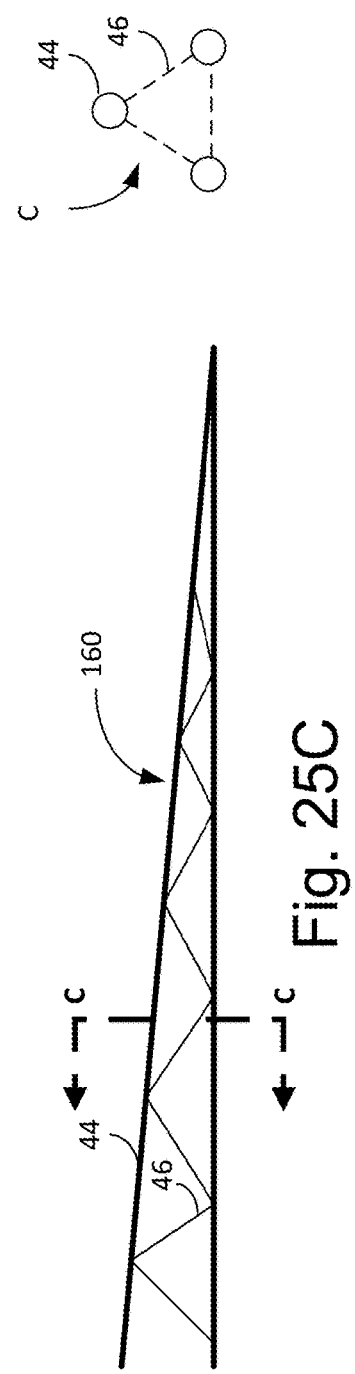
FIG. 25C is a side view and cross section of aspects of the system; and,
FIG. 26 is a side view of aspects of the system.

The outriggers can be constructed from several components such as shown in FIG. 25A. In this embodiment, the outrigger 160 is constructed from several tube structures where the proximal end 180 is attached to the tower base or lower tower position. In one example embodiment, the cross section of each component 420 of outrigger 160 can be generally circular. The tubing may also be square or other shapes sufficient to provide the necessary structural integrity as is understood by those skilled in the art. Referring to FIG. 25B, the outrigger can be a "T" beam construction with a "T" cross section. The outrigger can also be an "I" beam construction with an "I" construction. Referring to FIG. 25C, the outriggers can include one or more main supports that can have a triangular cross section where the main support 440 are connected to each other with secondary supports 460. The secondary supports can be arranged to define general triangles between the secondary supports.

In one embodiment, a foundation such as a concrete foundation can be used, and the tower base and the outriggers are connected to the foundation. The foundation can extend out to or past the distal ends of the outriggers. In one embodiment, a base foundation can be used to support the tower base and one or more outrigger foundations can be used to support the outriggers.

The use of the outriggers allows for the downward force of the tower base to be supported and when there is lateral force on the tower, one set of outriggers on one side of the tower can arrest or prevent the outriggers from being forced into the underlying support surface and another set of outriggers on the opposite side of the tower can prevent the outriggers from raising up from the underlying support surface.

Referring to FIG. 26, the tower is shown in a raised or vertical position. The hinge can be bolted to its respective section and removed once the tower portion or sections are connected. The cable 355 can be included in a block and tackle system 480. The lifting outrigger 320 can be attached at multiple connecting points 510 to a tower lifting support assembly 500 that can include the lifting outrigger and the hinge assembly. The tower can be attached to the tower lifting support assembly 500. The outriggers 160 can be attached to tower base 1000 at multiple connecting points 510. In operation, the forces on the lifting cable 355 are applied to the tower lifting support assembly 500, which in turn raises the tower. The tower lifting support assembly 500 can include multiple lifting outriggers and can include a lifting outrigger cross beam 410 (as shown in FIGS. 22A and 22B)

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An anchoring and lifting system for a wind turbine tower comprising:
   a tower base;
   a plurality of base anchors attached to the tower base;
   an anchor outrigger attached to and extending laterally outward from the tower base;
   at least one secondary anchor attached to the anchor outrigger;
   a lifting outrigger attached to a hinge wherein the hinge connects the tower base and a tower for moving the tower between a raised position and a lowered position;
   a static cable connected between a distal end of the lifting outrigger and a hub attached to the tower; and,
   a lifting cable attached between the distal end of the lifting outrigger and a winch, wherein the winch is carried by the tower base.

2. The anchoring and lifting system of claim 1 wherein the hinge includes at least one lateral mounting portion extending past a diameter of the tower and connecting to a proximal end of the lifting outrigger.

3. The anchoring and lifting system of claim 1 wherein the plurality of base anchors are attached to a flange carried by the tower base.

4. The anchoring and lifting system of claim 1 wherein the lifting cable is arranged in a block and tackle configuration.

5. The anchoring and lifting system of claim 1 wherein said tower includes a lower tower portion and an upper tower portion removable attached to each other.

6. The anchoring and lifting system of claim 5 wherein a first portion of the hinge is connected to said lower tower portion, and a second portion of said hinge is connected to said tower base so that said tower is pivotally carried on said tower base for moving between the raised and lowered positions.

7. The anchoring and lifting system of claim 1 wherein said lifting outrigger includes a first lifting outrigger and a second lifting outrigger laterally spaced from the first lifting outrigger; a lifting outrigger cross beam interconnecting the first lifting outrigger and the second lifting outrigger; and, wherein a proximal end of the first and second lifting outriggers are carried on lateral mounting portions of the hinge so that the first and second lifting outriggers are disposed on opposing sides of the tower.

8. The anchoring and lifting system of claim 7 wherein said static cable includes a first static cable extending from the hub to the distal end of the first lifting outrigger and a second static cable extending from the hub to the distal end of the second lifting outrigger.

9. The anchoring and lifting system of claim 8 wherein said lifting cable includes including a first lifting cable extending from the distal end of the first lifting outrigger to the winch and a second lifting cable extending from the distal end of the second lifting outrigger to the winch.

10. The anchoring and lifting system of claim 1 including a first pulley attached to said distal end of the lifting outrigger and receiving the lifting cable.

11. The anchoring and lifting system of claim 10 including a second pulley attached to a distal end of the anchor outrigger and receiving the lifting cable, wherein when the lifting cable is retracted by the winch the tower is moved to the raised position, and wherein when the lifting cable is extended by the winch the tower is moved to the lowered position.

12. An anchoring and lifting system for a wind turbine tower comprising:
   a tower base;
   a plurality of base anchors attached to the tower base;
   an anchor outrigger attached to and extending laterally outward from the tower base;
   at least one secondary anchor attached to the anchor outrigger;
   a lifting outrigger attached to a hinge wherein the hinge connects the tower base and a tower for moving the tower between a raised position and a lowered position;
   a lifting cable extending between a hub attached to the tower and a distal end of the lifting outrigger, and the lifting cable extending from the distal end of the lifting outrigger to a winch, wherein the winch is carried by the tower base.

13. The anchoring and lifting system of claim 12 wherein the hinge includes lateral mounting portions extending past a diameter of the tower for connecting to a proximal end of the lifting outrigger.

14. The anchoring and lifting system of claim 13 wherein said lifting outrigger includes a first lifting outrigger and a second lifting outrigger laterally spaced from the first lifting outrigger; a lifting outrigger cross beam interconnecting the first lifting outrigger and the second lifting outrigger; and, wherein a proximal end of the first and second lifting outriggers are carried on the lateral mounting portions of the hinge so that the first and second lifting outriggers are disposed on opposing sides of the tower.

15. The anchoring and lifting system of claim 12 including a first pulley attached to said distal end of the lifting outrigger and receiving the lifting cable.

16. The anchoring and lifting system of claim 15 including a second pulley attached to a distal end of the anchor outrigger and receiving the lifting cable, wherein when the lifting cable is retracted by the winch the tower is moved to the raised position, and wherein when the lifting cable is extended by the winch the tower is moved to the lowered position.

17. An anchoring and lifting system for a wind turbine tower comprising:
   a tower base;
   a plurality of base anchors attached to the tower base;
   an anchor outrigger attached to and extending laterally outward from the tower base;
   at least one secondary anchor attached to the anchor outrigger;
   a hinge connecting the tower base and a tower for moving the tower between a raised position and a lowered position; wherein the hinge includes lateral mounting portions extending past a diameter of the tower;
   a first lifting outrigger attached at a proximal end to one of the lateral mounting portions of the hinge;
   a second lifting outrigger attached at a proximal end to another of the lateral mounting portions of the hinge and laterally spaced from the first lifting outrigger so that the first and second lifting outriggers are disposed on opposing sides of the tower;
   a lifting outrigger cross beam interconnecting the first lifting outrigger and the second lifting outrigger;
   a first static cable connected between a distal end of the first lifting outrigger and a hub attached to the tower;
   a second static cable connected between a distal end of the second lifting outrigger and the hub attached to the tower; and,
   a lifting cable attached between the lifting outrigger cross beam and a winch, wherein the winch is carried by the tower base, and wherein when the lifting cable is retracted by the winch the tower is moved to the raised position, and wherein when the lifting cable is extended by the winch the tower is moved to the lowered position.

18. The anchoring and lifting system of claim 17 wherein the plurality of base anchors are attached to a flange carried by the tower base.

19. The anchoring and lifting system of claim 17 wherein the lifting cable is arranged in a block and tackle configuration.

20. The anchoring and lifting system of claim 17 wherein the tower includes a lower tower portion and an upper tower portion removable attached to each other, and wherein a first portion of the hinge is connected to the lower tower portion, and a second portion of the hinge is connected to the tower base so that said tower is pivotally carried on said tower base for moving between the raised and lowered positions.

* * * * *